United States Patent
Venugopal et al.

(10) Patent No.: US 12,107,654 B2
(45) Date of Patent: Oct. 1, 2024

(54) BEAM RECOVERY TECHNIQUES IN BEAMFORMED WIRELESS COMMUNICATIONS

(71) Applicant: QUALCOMM Incorporated, San Diego, CA (US)

(72) Inventors: Kiran Venugopal, Raritan, NJ (US); Jung Ho Ryu, Fort Lee, NJ (US); Tianyang Bai, Bridgewater, NJ (US); Makesh Pravin John Wilson, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 91 days.

(21) Appl. No.: 16/734,803

(22) Filed: Jan. 6, 2020

(65) Prior Publication Data

US 2020/0228183 A1 Jul. 16, 2020

Related U.S. Application Data

(60) Provisional application No. 62/901,626, filed on Sep. 17, 2019, provisional application No. 62/790,912, filed on Jan. 10, 2019.

(51) Int. Cl.
*H04B 7/06* (2006.01)
*H04L 5/00* (2006.01)
(Continued)

(52) U.S. Cl.
CPC ......... *H04B 7/0695* (2013.01); *H04B 7/0617* (2013.01); *H04L 5/005* (2013.01);
(Continued)

(58) Field of Classification Search
CPC ..... H04W 24/10; H04W 36/32; H04W 72/02; H04W 72/0413; H04W 72/042;
(Continued)

(56) References Cited

U.S. PATENT DOCUMENTS 10,194,442 B2 * 1/2019 Nagaraja ............. H04W 72/046
10,454,755 B2 * 10/2019 John Wilson ....... H04L 41/0654
(Continued)

OTHER PUBLICATIONS

International Search Report and Written Opinion—PCT/US2020/012598—ISAEPO—May 4, 2020.
(Continued)

*Primary Examiner* — Jason E Mattis
(74) *Attorney, Agent, or Firm* — Holland & Hart LLP

(57) ABSTRACT

Methods, systems, and devices for wireless communications are described that provide for measurement and recovery of beamformed transmission beams in which an uplink beam and a downlink beam may be decoupled beams that use different beamforming parameters. In the event that a user equipment (UE) detects a failure of the downlink beam, an indication may be provided to a base station, and the downlink beam may be switched to correspond to the uplink beam. In the event that the UE detects a failure of the uplink beam the UE may identify a candidate beam and transmit a beam recovery message to the base station. The downlink beam may have an associated first set of reference signals, and the uplink beam may have an associated second set of reference signals, and beam failure may be determined based on the different sets of reference signals.

47 Claims, 21 Drawing Sheets

(51) Int. Cl.
*H04W 16/28* (2009.01)
*H04W 24/08* (2009.01)
*H04W 72/044* (2023.01)
*H04W 72/1268* (2023.01)
*H04W 72/23* (2023.01)
*H04W 76/11* (2018.01)
*H04W 76/18* (2018.01)
*H04W 80/02* (2009.01)

(52) U.S. Cl.
CPC ........... *H04W 16/28* (2013.01); *H04W 24/08* (2013.01); *H04W 72/046* (2013.01); *H04W 72/0466* (2013.01); *H04W 72/1268* (2013.01); *H04W 72/23* (2023.01); *H04W 76/11* (2018.02); *H04W 76/18* (2018.02); *H04W 80/02* (2013.01)

(58) Field of Classification Search
CPC . H04W 72/046; H04W 72/08; H04W 76/027; H04W 76/028; H04B 7/0695
USPC .......................... 370/310, 328–330, 216, 225
See application file for complete search history.

(56) References Cited

U.S. PATENT DOCUMENTS

| | | | |
|---|---|---|---|
| 10,548,182 B2 * | 1/2020 | Luo | H04W 72/046 |
| 10,601,492 B2 * | 3/2020 | Xia | H04B 7/0695 |
| 10,778,318 B2 * | 9/2020 | Cirik | H04W 76/19 |
| 10,904,940 B2 * | 1/2021 | Zhou | H04W 76/19 |
| 11,039,350 B2 * | 6/2021 | Cirik | H04B 7/0695 |
| 2017/0331670 A1 * | 11/2017 | Parkvall | H04L 41/0816 |
| 2018/0191422 A1 | 7/2018 | Xia et al. | |
| 2018/0220448 A1 | 8/2018 | Akkarakaran et al. | |
| 2018/0249526 A1 | 8/2018 | Nagaraja et al. | |
| 2018/0278467 A1 | 9/2018 | John Wilson et al. | |
| 2018/0302889 A1 | 10/2018 | Guo et al. | |
| 2019/0394082 A1 * | 12/2019 | Cirik | H04L 5/0048 |
| 2020/0145280 A1 * | 5/2020 | Cirik | H04L 41/0668 |
| 2020/0163074 A1 * | 5/2020 | Tang | H04W 72/23 |
| 2020/0228183 A1 * | 7/2020 | Venugopal | H04B 7/063 |
| 2020/0350972 A1 * | 11/2020 | Yi | H04L 5/0051 |
| 2020/0350973 A1 * | 11/2020 | Cirik | H04B 7/0695 |
| 2020/0351054 A1 * | 11/2020 | Jung | H04W 74/0833 |
| 2021/0058130 A1 * | 2/2021 | Zhu | H04B 7/0695 |

OTHER PUBLICATIONS

Partial International Search Report—PCT/US2020/012598—ISA/EPO—Mar. 16, 2020.

Interdigital Inc: "On UE Specific Scrambling", 3GPP TSG RAN WG1 Meeting 90bis, R1-1718500, 33rd Generation Partnership Project (3GPP), Mobile Competence Centre, 650, Route Des Lucioles, F-06921, Sophia-Antipolis Cedex, France, vol. RAN WG1, No. Prague, Czech Republic, Oct. 9, 2017-Oct. 13, 2017, Oct. 8, 2017, 2 Pages, XP051341682.

* cited by examiner

BEAM RECOVERY TECHNIQUES IN BEAMFORMED WIRELESS COMMUNICATIONS

CROSS REFERENCE

The present Application for Patent claims the benefit of U.S. Provisional Patent Application No. 62/790,912 by Venugopal, et al., entitled "BEAM RECOVERY TECHNIQUES IN BEAMFORMED WIRELESS COMMUNICATIONS," filed Jan. 10, 2019, and to U.S. Provisional Patent Application No. 62/901,626 by Venugopal, et al., entitled "BEAM RECOVERY TECHNIQUES IN BEAMFORMED WIRELESS COMMUNICATIONS" filed Sep. 17, 2019, assigned to the assignee hereof, and expressly incorporated herein.

BACKGROUND

The following relates generally to wireless communications, and more specifically to beam recovery techniques in beamformed wireless communications.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

In some cases, wireless devices (e.g., base stations, UEs, etc.) may use beamformed or precoded signals for transmission and/or reception of wireless communications. For example, a base station may utilize beamformed or precoded transmissions to provide directional transmissions that may mitigate path losses that may be experienced by non-beamformed or non-precoded transmissions which may have a relatively wide beam or omnidirectional transmission pattern. In some cases, different beamforming parameters may be used for downlink transmissions (e.g., from a base station to a UE) than are used for uplink transmissions (e.g., from a UE to a base station). Such different beamforming parameters, which may be referred to as decoupled beams, may result from interference that may interfere with an uplink beam but not a downlink beam (e.g., an obstructed UE antenna used for uplink transmissions, an interfering device in proximity to the UE, etc.), maximum permissible exposure (MPE) limits associated with a particular uplink beam, available power that may be used for an uplink transmission, or any combinations thereof. Efficient techniques for managing decoupled beams may help enhance reliability and efficiency of a network utilizing beamforming.

SUMMARY

The described techniques relate to improved methods, systems, devices, and apparatuses that support beam recovery techniques in beamformed wireless communications. Various described techniques provide for establishment of communications between a user equipment (UE) and a base station via beamformed transmission beams. In some cases an uplink beam and a downlink beam may be decoupled beams that use different beamforming parameters. In the event that the UE detects a failure of the downlink beam, an indication may be provided to the base station. In the event that the UE detects a failure of the uplink beam, or both the uplink and downlink beam, the UE may identify a candidate beam and transmit a beam recovery message (e.g., a random access channel (RACH) message) to initiate a beam recovery. In some cases, the downlink beam may have an associated first set of reference signals, and the uplink beam may have an associated second set of reference signals that is different than the first set of reference signals. In some cases, the determination of a failure of the downlink beam or uplink beam may be based at least in part on measurements of the associated first set of reference signals and second set of reference signals.

A method of wireless communication is described. The method may include establishing, at a UE, a connection with a base station via a downlink beam for transmissions from the base station to the UE and an uplink beam for transmissions from the UE to the base station, determining that a beam failure of the downlink beam has occurred, transmitting a beam failure indication to the base station that indicates the beam failure of the downlink beam, and monitoring, responsive to the beam failure indication, for control information that is scrambled with a unique sequence associated with the UE.

An apparatus for wireless communication is described. The apparatus may include a processor, memory in electronic communication with the processor, and instructions stored in the memory. The instructions may be executable by the processor to cause the apparatus to establish, at a UE, a connection with a base station via a downlink beam for transmissions from the base station to the UE and an uplink beam for transmissions from the UE to the base station, determine that a beam failure of the downlink beam has occurred, transmit a beam failure indication to the base station that indicates the beam failure of the downlink beam, and monitor, responsive to the beam failure indication, for control information that is scrambled with a unique sequence associated with the UE.

Another apparatus for wireless communication is described. The apparatus may include means for establishing, at a UE, a connection with a base station via a downlink beam for transmissions from the base station to the UE and an uplink beam for transmissions from the UE to the base station, determining that a beam failure of the downlink beam has occurred, transmitting a beam failure indication to the base station that indicates the beam failure of the downlink beam, and monitoring, responsive to the beam failure indication, for control information that is scrambled with a unique sequence associated with the UE.

A non-transitory computer-readable medium storing code for wireless communication is described. The code may include instructions executable by a processor to establish, at a UE, a connection with a base station via a downlink beam for transmissions from the base station to the UE and an uplink beam for transmissions from the UE to the base station, determine that a beam failure of the downlink beam has occurred, transmit a beam failure indication to the base station that indicates the beam failure of the downlink beam, and monitor, responsive to the beam failure indication, for control information that is scrambled with a unique sequence associated with the UE.

In some examples of the method, apparatuses, and non-transitory computer-readable medium described herein, the transmitting the beam failure indication may include operations, features, means, or instructions for transmitting a scheduling request (SR) to the base station, via the uplink beam, that includes one or more bits that indicate the beam failure of the downlink beam. In some examples of the method, apparatuses, and non-transitory computer-readable medium described herein, the transmitting the beam failure indication may include operations, features, means, or instructions for transmitting the beam failure indication in a PUCCH transmission via the uplink beam.

In some examples of the method, apparatuses, and non-transitory computer-readable medium described herein, the determining the beam failure of the downlink beam may include operations, features, means, or instructions for monitoring a first set of reference signals transmitted by the base station via one or more beams associated with the downlink beam, monitoring a second set of reference signals transmitted by the base station via one or more beams associated with the uplink beams, and determining that a parameter of one or more reference signals of the first set of reference signals is below a threshold value.

Some examples of the method, apparatuses, and non-transitory computer-readable medium described herein may further include operations, features, means, or instructions for receiving, from the base station, control information that indicates the first set of reference signals associated with the downlink beam and the second set of reference signals associated with the uplink beam. In some examples of the method, apparatuses, and non-transitory computer-readable medium described herein, the control information that is scrambled with the unique sequence may be monitored by the UE for a predetermined time after sending a beam failure indication.

Some examples of the method, apparatuses, and non-transitory computer-readable medium described herein may further include operations, features, means, or instructions for receiving, responsive to the beam failure indication, a beam switch command from the base station that indicates that the beamforming parameters associated with the downlink beam are to be switched to correspond to beamforming parameters of the uplink beam. Some examples of the method, apparatuses, and non-transitory computer-readable medium described herein may further include operations, features, means, or instructions for monitoring for a beam switch command from the base station, and retransmitting the beam failure indication to the base station responsive to determining that a predetermined time period has elapsed without receiving the beam switch command. Some examples of the method, apparatuses, and non-transitory computer-readable medium described herein may further include operations, features, means, or instructions for declaring a radio link failure (RLF) based on the UE performing a maximum number of retransmissions of the beam failure indication.

In some examples of the method, apparatuses, and non-transitory computer-readable medium described herein, the beam failure indication may be transmitted in a SR beam sweeping operation of the base station, and where the monitoring may be performed using time division multiplexing according to the SR beam sweeping operation. In some examples of the method, apparatuses, and non-transitory computer-readable medium described herein, the determining the beam failure of the downlink beam may be based on one or more of a reference signal received power (RSRP), signal to interference and noise ratio (SINR), or any combinations thereof, of one or more reference signal transmissions via the downlink beam.

Some examples of the method, apparatuses, and non-transitory computer-readable medium described herein may further include operations, features, means, or instructions for monitoring, prior to the switching the beamforming parameters, for one or more control resource set (CORESET) transmissions from the base station via the downlink beam, receiving a beam switch command from the base station that indicates that the beamforming parameters associated with the downlink beam are to be switched to correspond to beamforming parameters of the uplink beam, and monitoring, after switching the beamforming parameters of the downlink beam, for one or more CORESET transmissions from the base station via one or more beams associated with the uplink beam. Some examples of the method, apparatuses, and non-transitory computer-readable medium described herein may further include operations, features, means, or instructions for identifying that a number of CORESETs transmitted via the one or more beams associated with the uplink beam exceed a predetermined number of CORESETs, and down-selecting the number of CORESETs based on a priority rule for CORESET monitoring. In some examples of the method, apparatuses, and non-transitory computer-readable medium described herein, the priority rule may be based on one or more or a periodicity of CORESET transmissions, a CORESET identification, a type of CORESET, a channel quality metric associated with each CORESET transmission, or any combination thereof.

A method of wireless communication is described. The method may include establishing, at a base station, a connection with a UE via a downlink beam for transmissions from the base station to the UE and an uplink beam for transmissions from the UE to the base station, receiving a beam failure indication from the UE that indicates a beam failure of the downlink beam at the UE, and transmitting control information to the UE to switch beamforming parameters associated with the downlink beam, where the control information is scrambled with a unique sequence associated with the UE.

An apparatus for wireless communication is described. The apparatus may include a processor, memory in electronic communication with the processor, and instructions stored in the memory. The instructions may be executable by the processor to cause the apparatus to establish, at a base station, a connection with a UE via a downlink beam for transmissions from the base station to the UE and an uplink beam for transmissions from the UE to the base station, receive a beam failure indication from the UE that indicates a beam failure of the downlink beam at the UE, and transmit control information to the UE to switch beamforming parameters associated with the downlink beam, where the control information is scrambled with a unique sequence associated with the UE.

Another apparatus for wireless communication is described. The apparatus may include means for establishing, at a base station, a connection with a UE via a downlink beam for transmissions from the base station to the UE and an uplink beam for transmissions from the UE to the base station, receiving a beam failure indication from the UE that indicates a beam failure of the downlink beam at the UE, and transmitting control information to the UE to switch beamforming parameters associated with the downlink beam, where the control information is scrambled with a unique sequence associated with the UE.

A non-transitory computer-readable medium storing code for wireless communication is described. The code may include instructions executable by a processor to establish, at a base station, a connection with a UE via a downlink beam for transmissions from the base station to the UE and an uplink beam for transmissions from the UE to the base station, receive a beam failure indication from the UE that indicates a beam failure of the downlink beam at the UE, and transmit control information to the UE to switch beamforming parameters associated with the downlink beam, where the control information is scrambled with a unique sequence associated with the UE.

In some examples of the method, apparatuses, and non-transitory computer-readable medium described herein, the receiving the beam failure indication may include operations, features, means, or instructions for receiving a SR from the UE, via the uplink beam, that includes one or more bits that indicate the beam failure of the downlink beam. In some examples of the method, apparatuses, and non-transitory computer-readable medium described herein, the receiving the beam failure indication may include operations, features, means, or instructions for receiving the beam failure indication in a PUCCH transmission from the UE via the uplink beam.

Some examples of the method, apparatuses, and non-transitory computer-readable medium described herein may further include operations, features, means, or instructions for transmitting a first set of reference signals via a first set of beams associated with the downlink beam, and transmitting a second set of reference signals via a second set of beams associated with the uplink beams, and where the beam failure indication indicates a parameter of one or more reference signals of the first set of reference signals as measured at the UE is below a threshold value. Some examples of the method, apparatuses, and non-transitory computer-readable medium described herein may further include operations, features, means, or instructions for configuring the UE with the first set of reference signals to be monitored in the first set of beams and the second set of reference signals to be monitored in the second set of beams.

In some examples of the method, apparatuses, and non-transitory computer-readable medium described herein, the indication to the UE to switch beamforming parameters includes a beam switch command that is transmitted to the UE. In some examples of the method, apparatuses, and non-transitory computer-readable medium described herein, the beam failure indication may be received in a SR beam sweeping operation of the base station, and where the beam switch command is transmitted according to the SR beam sweeping operation.

A method of wireless communication is described. The method may include establishing, at a UE, a connection with a base station via a first downlink beam for transmissions from the base station to the UE and a first uplink beam for transmissions from the UE to the base station, where the first downlink beam and the first uplink beam are decoupled beams that use different beamforming parameters, monitoring a first set of reference signals transmitted by the base station via a first set of beams associated with the first downlink beam, and a second set of reference signals transmitted by the base station via a second set of beams associated with the first uplink beam, determining, based on the monitoring, a beam failure of the first uplink beam, or both the first uplink beam and the first downlink beam, has occurred, and transmitting a beam failure indication to the base station that indicates the beam failure of the first uplink beam or both the first uplink beam and the first downlink beam.

An apparatus for wireless communication is described. The apparatus may include a processor, memory in electronic communication with the processor, and instructions stored in the memory. The instructions may be executable by the processor to cause the apparatus to establish, at a UE, a connection with a base station via a first downlink beam for transmissions from the base station to the UE and a first uplink beam for transmissions from the UE to the base station, where the first downlink beam and the first uplink beam are decoupled beams that use different beamforming parameters, monitor a first set of reference signals transmitted by the base station via a first set of beams associated with the first downlink beam, and a second set of reference signals transmitted by the base station via a second set of beams associated with the first uplink beam, determine, based on the monitoring, a beam failure of the first uplink beam, or both the first uplink beam and the first downlink beam, has occurred, and transmit a beam failure indication to the base station that indicates the beam failure of the first uplink beam or both the first uplink beam and the first downlink beam.

Another apparatus for wireless communication is described. The apparatus may include means for establishing, at a UE, a connection with a base station via a first downlink beam for transmissions from the base station to the UE and a first uplink beam for transmissions from the UE to the base station, where the first downlink beam and the first uplink beam are decoupled beams that use different beamforming parameters, monitoring a first set of reference signals transmitted by the base station via a first set of beams associated with the first downlink beam, and a second set of reference signals transmitted by the base station via a second set of beams associated with the first uplink beam, determining, based on the monitoring, a beam failure of the first uplink beam, or both the first uplink beam and the first downlink beam, has occurred, and transmitting a beam failure indication to the base station that indicates the beam failure of the first uplink beam or both the first uplink beam and the first downlink beam.

A non-transitory computer-readable medium storing code for wireless communication is described. The code may include instructions executable by a processor to establish, at a UE, a connection with a base station via a first downlink beam for transmissions from the base station to the UE and a first uplink beam for transmissions from the UE to the base station, where the first downlink beam and the first uplink beam are decoupled beams that use different beamforming parameters, monitor a first set of reference signals transmitted by the base station via a first set of beams associated with the first downlink beam, and a second set of reference signals transmitted by the base station via a second set of beams associated with the first uplink beam, determine, based on the monitoring, a beam failure of the first uplink beam, or both the first uplink beam and the first downlink beam, has occurred, and transmit a beam failure indication to the base station that indicates the beam failure of the first uplink beam or both the first uplink beam and the first downlink beam.

Some examples of the method, apparatuses, and non-transitory computer-readable medium described herein may further include operations, features, means, or instructions for monitoring a predetermined search space for a response message from the base station that activates a different uplink beam, a different downlink beam, or any combinations thereof, for subsequent communications between the UE and the base station. In some examples of the method, apparatuses, and non-transitory computer-readable medium described herein, the beam failure of the first uplink beam may be a function of one or more uplink parameters associated with the first uplink beam, the one or more uplink parameters including one or more of an uplink transmission power, a modulation and coding scheme (MCS), a modulation order, a coding rate, or any combinations thereof.

Some examples of the method, apparatuses, and non-transitory computer-readable medium described herein may further include operations, features, means, or instructions for measuring, responsive to determining the beam failure, one or more parameters of the second set of beams, and identifying a second uplink beam based on the measuring, and where the beam failure indication is transmitted via the second uplink beam. Some examples of the method, apparatuses, and non-transitory computer-readable medium described herein may further include operations, features, means, or instructions for receiving, from the base station, a response message indicating that the second uplink beam is to be used for subsequent communications with the UE. In some examples of the method, apparatuses, and non-transitory computer-readable medium described herein, the beam failure indication and the response message are RACH messages.

In some examples of the method, apparatuses, and non-transitory computer-readable medium described herein, the response message may be transmitted via a downlink control channel transmission having one or more of a control information format associated with a changed uplink transmission beam, an applied scrambling sequence associated with a changed uplink transmission beam, a special medium access control (MAC) control element (MAC-CE) associated with a changed uplink transmission beam, or any combinations thereof. Some examples of the method, apparatuses, and non-transitory computer-readable medium described herein may further include operations, features, means, or instructions for transmitting to the base station, responsive to the received response message, an acknowledgment that indicates the UE successfully received the response message, where the acknowledgment is transmitted via the second uplink beam.

A method of wireless communication is described. The method may include establishing, at a base station, a connection with a UE via a first downlink beam for transmissions from the base station to the UE and a first uplink beam for transmissions from the UE to the base station, where the first downlink beam and the first uplink beam are decoupled beams that use different beamforming parameters, configuring the UE to monitor a first set of reference signals for transmission via a first set of beams associated with the first downlink beam, and a second set of reference signals for transmission via a second set of beams associated with the first uplink beam, transmitting the first set of reference signals and the second set of reference signals, receiving a beam failure indication from the UE that indicates a beam failure of the first uplink beam or both the first uplink beam and the first downlink beam, and activating, responsive to the beam failure indication, a second uplink beam for subsequent communications with the UE.

An apparatus for wireless communication is described. The apparatus may include a processor, memory in electronic communication with the processor, and instructions stored in the memory. The instructions may be executable by the processor to cause the apparatus to establish, at a base station, a connection with a UE via a first downlink beam for transmissions from the base station to the UE and a first uplink beam for transmissions from the UE to the base station, where the first downlink beam and the first uplink beam are decoupled beams that use different beamforming parameters, configure the UE to monitor a first set of reference signals for transmission via a first set of beams associated with the first downlink beam, and a second set of reference signals for transmission via a second set of beams associated with the first uplink beam, transmit the first set of reference signals and the second set of reference signals, receive a beam failure indication from the UE that indicates a beam failure of the first uplink beam or both the first uplink beam and the first downlink beam, and activate, responsive to the beam failure indication, a second uplink beam for subsequent communications with the UE.

Another apparatus for wireless communication is described. The apparatus may include means for establishing, at a base station, a connection with a UE via a first downlink beam for transmissions from the base station to the UE and a first uplink beam for transmissions from the UE to the base station, where the first downlink beam and the first uplink beam are decoupled beams that use different beamforming parameters, configuring the UE to monitor a first set of reference signals for transmission via a first set of beams associated with the first downlink beam, and a second set of reference signals for transmission via a second set of beams associated with the first uplink beam, transmitting the first set of reference signals and the second set of reference signals, receiving a beam failure indication from the UE that indicates a beam failure of the first uplink beam or both the first uplink beam and the first downlink beam, and activating, responsive to the beam failure indication, a second uplink beam for subsequent communications with the UE.

A non-transitory computer-readable medium storing code for wireless communication is described. The code may include instructions executable by a processor to establish, at a base station, a connection with a UE via a first downlink beam for transmissions from the base station to the UE and a first uplink beam for transmissions from the UE to the base station, where the first downlink beam and the first uplink beam are decoupled beams that use different beamforming parameters, configure the UE to monitor a first set of reference signals for transmission via a first set of beams associated with the first downlink beam, and a second set of reference signals for transmission via a second set of beams associated with the first uplink beam, transmit the first set of reference signals and the second set of reference signals, receive a beam failure indication from the UE that indicates a beam failure of the first uplink beam or both the first uplink beam and the first downlink beam, and activate, responsive to the beam failure indication, a second uplink beam for subsequent communications with the UE.

In some examples of the method, apparatuses, and non-transitory computer-readable medium described herein, the activating may include operations, features, means, or instructions for transmitting, using downlink resources within a predetermined search space, a response message to the UE that activates the second uplink beam, a second downlink beam, or any combinations thereof, for subsequent communications between the UE and the base station. In some examples of the method, apparatuses, and non-transitory computer-readable medium described herein, the beam failure indication may be received via the second uplink beam, and where the second uplink beam is within the second set of beams. In some examples of the method, apparatuses, and non-transitory computer-readable medium described herein, the beam failure indication from the UE, and a response message transmitted by the base station that activates the second uplink beam, are RACH messages.

In some examples of the method, apparatuses, and non-transitory computer-readable medium described herein, the response message may be transmitted via a downlink control channel transmission having one or more of a control information format associated with a changed uplink transmission beam, an applied scrambling sequence associated with a changed uplink transmission beam, a special MAC-CE associated with a changed uplink transmission beam, or any combinations thereof. Some examples of the method, apparatuses, and non-transitory computer-readable medium described herein may further include operations, features, means, or instructions for receiving, responsive to transmitting the response message, an acknowledgment from the UE that indicates the UE successfully received the response message, where the acknowledgment is transmitted via the second uplink beam.

DETAILED DESCRIPTION

Figure 1:
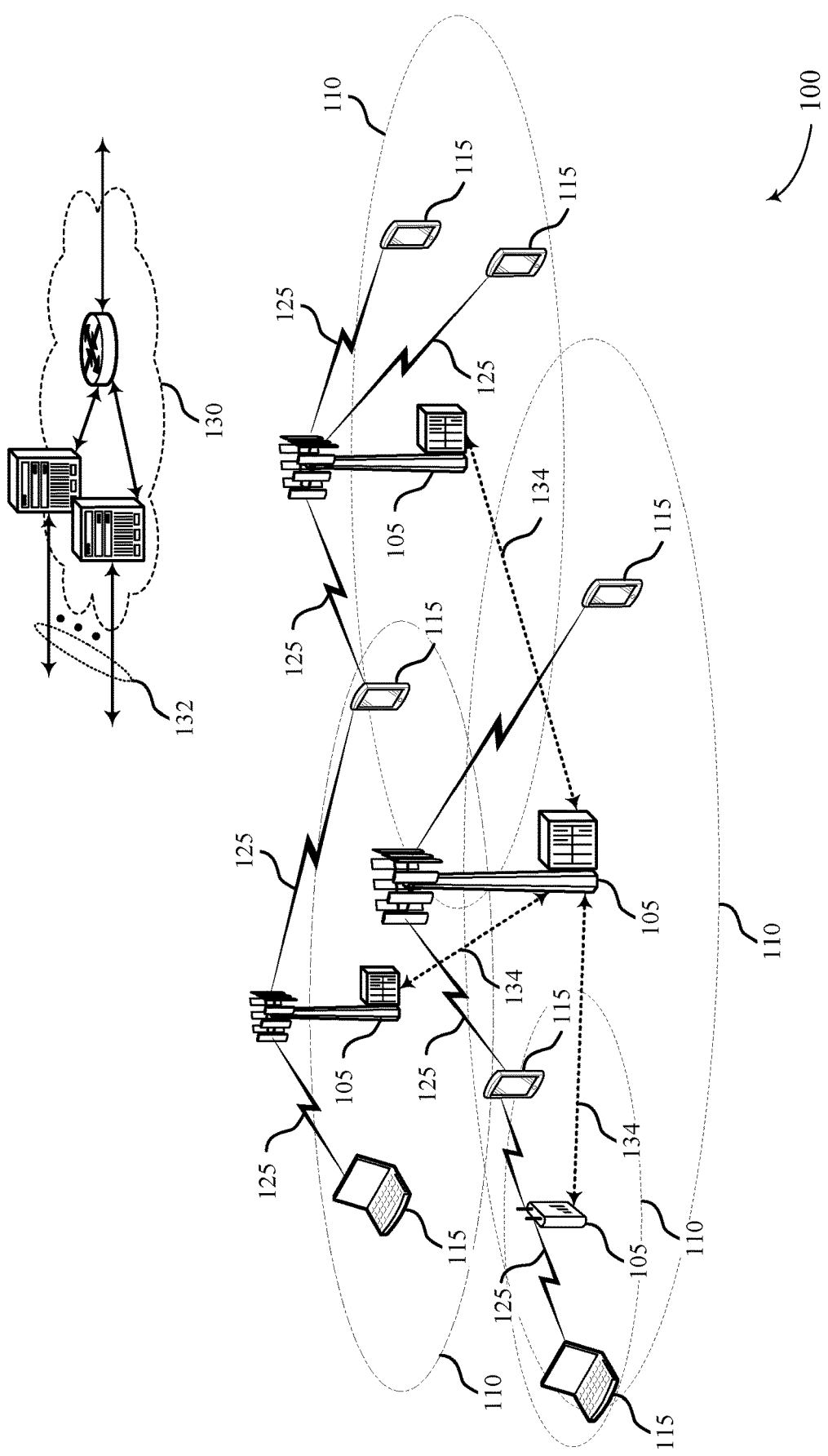
FIG. 1 illustrates an example of a system for wireless communications that supports beam recovery techniques in beamformed wireless communications in accordance with aspects of the present disclosure.

Various aspects of the present disclosure relate to methods, systems, devices, and apparatuses that support beam switching and beam recovery for beamformed communications between a user equipment (UE) and a base station. In some cases, a UE and base station may establish a connection via beamformed transmission beams that include an uplink beam and a downlink beam. In some cases, the uplink beam and downlink beam are decoupled beams that use different beamforming parameters. In the event that the UE detects a failure of the downlink beam, the uplink beam, or both beams, beam recovery techniques as discussed herein may provide for efficient beam recovery.

In some cases, decoupled beams may result from operations conditions at the UE, and may provide more efficient and reliable communications than coupled beams in which beamforming parameters of an uplink beam correspond to beamforming parameters of a downlink beam. Such decoupled beam operation may result, for example, from interference that may interfere with an uplink beam but not a downlink beam, such as due to an obstructed UE antenna used for uplink transmissions (e.g., if a user's hand covers an antenna patch at the UE), an interfering device in proximity to the UE (e.g., a different UE that transmits uplink signals using the same time or frequency resources), maximum permissible exposure (MPE) limits associated with a particular uplink beam, available power that may be used for an uplink transmission, or any combinations thereof, which results in different beamforming parameters between an uplink beam and a downlink beam.

In some cases, when a connection is established using decoupled beams, the base station may configure different sets of references signals that are associated with the different beams. For example, the downlink beam may have an associated first set of reference signals, and the uplink beam may have an associated second set of reference signals that is different than the first set of reference signals. In some cases, the determination of a failure of the downlink beam or uplink beam may be based at least in part on measurements of the associated first set of reference signals and second set of reference signals made at the UE.

In some cases, in the event that the UE detects a failure in the downlink beam, but not the uplink beam, an indication may be provided to the base station, and the downlink beam may be switched to correspond to the uplink beam. In the event that the UE detects a failure of the uplink beam, or both the uplink and downlink beam, the UE may identify a candidate beam and transmit a beam recovery message (e.g., a scheduling request (SR) or a random access channel (RACH) message) to initiate a beam recovery. In some cases, the beam recovery message may be scrambled with a unique sequence (e.g., a radio network temporary identifier (RNTI)) associated with the UE. In some cases, the UE may determine that an uplink, or both an uplink and downlink, beam failure has occurred, and may perform a candidate beam search using the set of reference signals associated with the uplink beam.

Techniques as discussed herein may thus provide for efficient detection of beam failures and efficient recovery from such failures. Such techniques may thus enhance the efficiency and reliability of a wireless communications system through more efficient beamformed communications. For example, a beam failure of a downlink beam when using decoupled downlink and uplink beams may be recovered through switching the downlink beam to correspond to the uplink beam (i.e., the downlink beam and uplink beam are no longer decoupled), which may provide faster beam recovery than if the UE were to initiate a beam recovery through a random access procedure. Further, in cases where an uplink, or both uplink and downlink, beam failure has occurred, techniques as discussed herein advantageously do not require separate resources for downlink candidate beams to be identified.

Aspects of the disclosure are initially described in the context of wireless communications systems and beam recovery techniques that may be used in such systems. Aspects of the disclosure are further illustrated by and described with reference to apparatus diagrams, system diagrams, and flowcharts that relate to beam recovery techniques in beamformed wireless communications.

FIG. 1 illustrates an example of a wireless communications system 100 that supports beam recovery techniques in beamformed wireless communications in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices. In some cases, connections between UEs 115 and base stations 105 may use beamformed communications in which uplink beams may be decoupled with downlink beams, and beam failure detection and recovery may be performed in accordance with various techniques discussed herein.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array according to beamforming parameters such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, a receive beam and a transmit beam may use corresponding beamforming parameters. For example, a UE 115 may identify a particular downlink beam as a preferred receive beam, and the uplink beam for transmission from the UE 115 to a base station 105 may be determined to have the same or similar beamforming parameters as the identified preferred receive beam. In such cases, the receive and transmit beams of a UE may be coupled and one or more reference signals provided in the receive beam may be used to determine transmission parameters for the transmit beam. However, in some cases as discussed herein, a receive beam at a device may use different beamforming parameters than a transmit beam from the device. For example, a UE 115 may identify a particular downlink beam of a base station 105 as a preferred receive beam at the UE 115. The UE 115 may also identify a particular uplink beam for transmissions from the UE 115 to the base station 105 as a preferred transit beam, which may have different beamforming parameters than the preferred receive beam (e.g., due to interference with uplink transmissions at the UE, MPE limitations, transmission power constraints at the UE 115, etc.). In such cases, in accordance with various techniques as discussed herein, a base station 105 may transmit reference signals using separate beamforming parameters for use in managing such different downlink and uplink beams. Further, in some cases, beam failure detection and recovery may be performed based on one or more measurements from such reference signals.

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARM) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

In some cases, communications between a UE 115 and a base station 105 may be performed via beamformed transmission beams. In some cases, in the event that the UE 115 detects a failure of the downlink beam, an indication may be provided to the base station 105, and the downlink beam may be switched to correspond to the uplink beam. In the event that the UE 115 detects a failure of the uplink beam, or both the uplink and downlink beam, the UE 115 may identify a candidate beam and transmit a beam recovery message (e.g., a SR or random access channel (RACH) message) to initiate a beam recovery. In some cases, the downlink beam may have an associated first set of reference signals, and the uplink beam may have an associated second set of reference signals that is different than the first set of reference signals. In some cases, the determination of a failure of the downlink beam or uplink beam may be based at least in part on measurements of the associated first set of reference signals or second set of reference signals.

Figure 2:
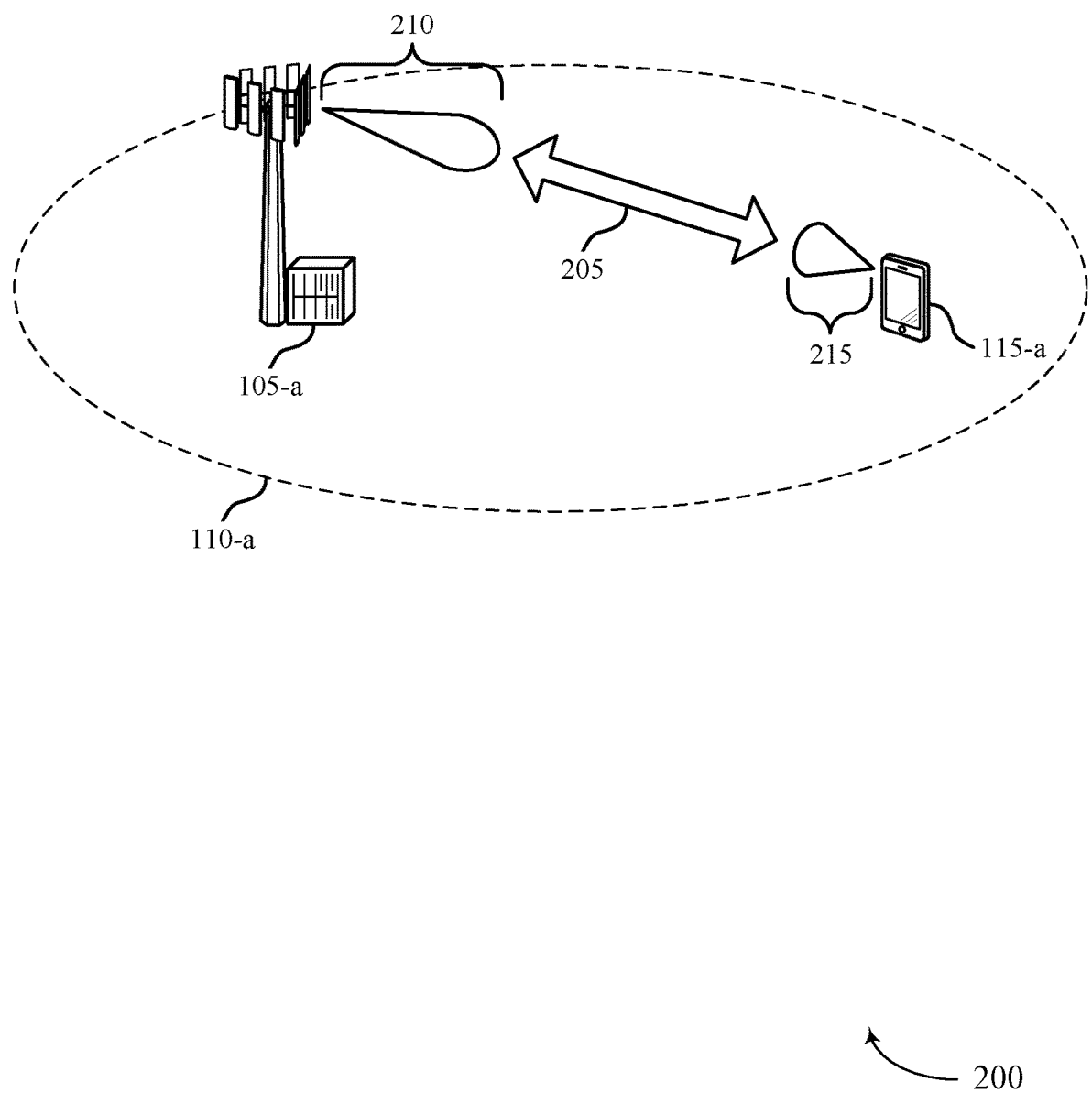
FIG. 2 illustrates an example of a portion of a wireless communications system that supports beam recovery techniques in beamformed wireless communications in accordance with aspects of the present disclosure.

FIG. 2 illustrates an example of a wireless communications system 200 that supports beam recovery techniques in beamformed wireless communications in accordance with aspects of the present disclosure. In some examples, wireless communications system 200 may implement aspects of wireless communications system 100. The wireless communications system 200 may include base station 105-*a* and UE 115-*a*, which may be examples of a base station 105 and a UE 115, as described with reference to FIG. 1.

Base station 105-*a* may provide network coverage for geographic area 110-*a*. Base station 105-*a* and UE 115-*a* may communicate using beamformed or directional transmissions for a connection 205 that carries uplink and downlink communications between the UE 115-*a* and the base station 105-*a*. For example, in downlink communications, base station 105-*a* may transmit downlink transmissions to UE 115-*a* using a beamformed downlink beam 210, which may be one of a number of downlink transmission beams used by the base station 105-*a*. The UE 115-*a* may transmit uplink transmissions to the base station 105-*a* using a beamformed uplink beam 215.

In this example, the UE 115-*a* and base station 105-*a* may use corresponding beamforming parameters associated with a particular transmission beam to configure receive hardware for transmitting/receiving beamformed transmissions in which the downlink beam 210 and uplink beam 215 are coupled transmission beams. The beamforming parameters may include a particular spatial domain filter for uplink or downlink communications that is associated with a particular transmission beam. In cases with coupled transmission beams, the beamforming parameters of the uplink beam 215 may be determined based on one or more reference signals that are received on the downlink beam 210 which is quasi co-located (QCL) with the uplink beam 215. Two antenna ports are said to be QCL if properties of the channel over which a symbol on one antenna port is conveyed can be inferred from the channel over which a symbol on the other antenna port is conveyed. In some cases, QCL may apply to a spatial receive parameter, which may be referred to as QCL-TypeD. In some cases, as indicated above, downlink beam 210 and uplink beam 215 may be decoupled, such as illustrated in FIG. 3.

Figure 3:
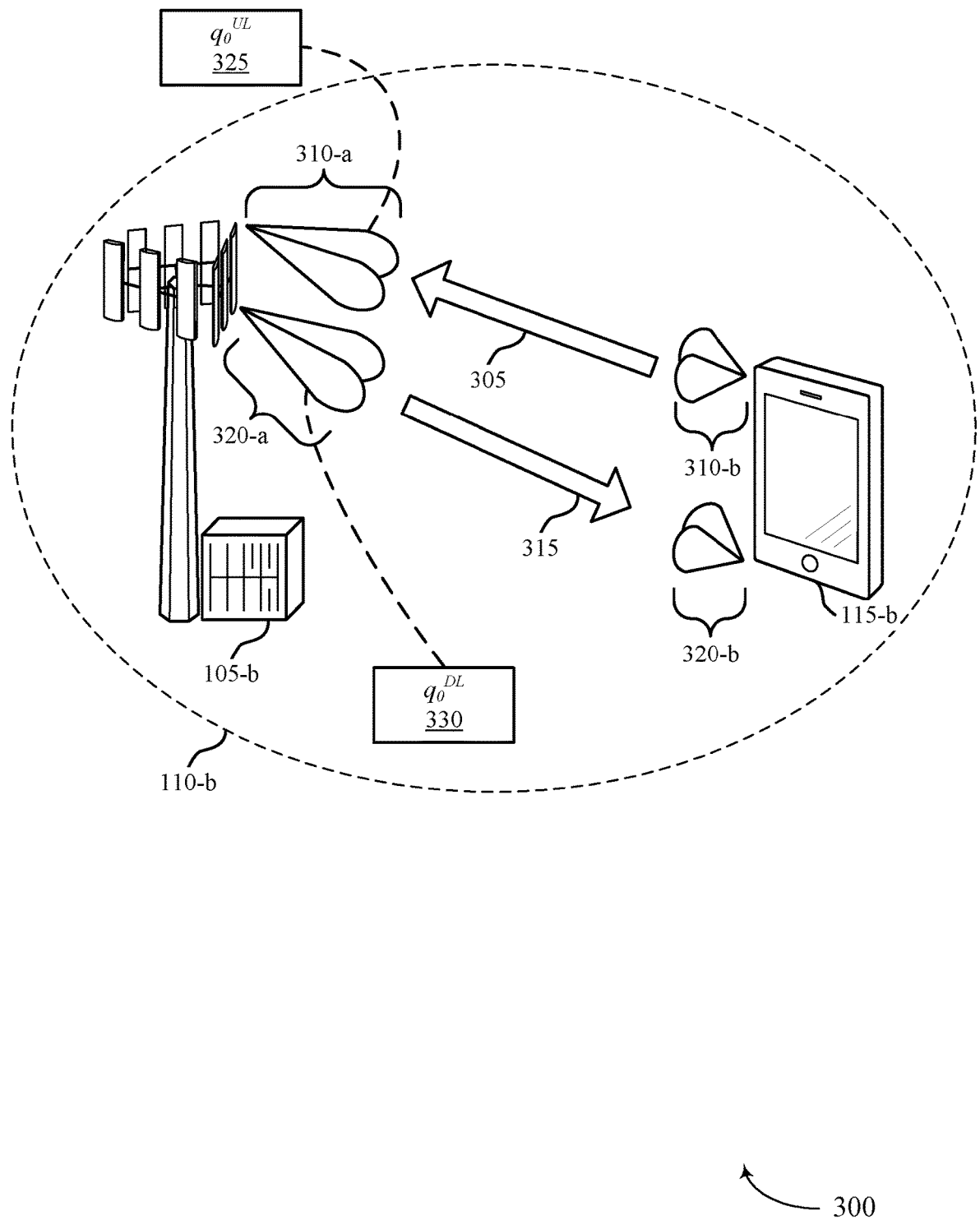
FIG. 3 illustrates another example of a portion of a wireless communications system with decoupled uplink and downlink beams that supports beam recovery techniques in beamformed wireless communications in accordance with aspects of the present disclosure.

FIG. 3 illustrates an example of a wireless communications system 300 that supports beam recovery techniques in beamformed wireless communications in accordance with aspects of the present disclosure. In some examples, wireless communications system 300 may implement aspects of wireless communications system 100 or 200. The wireless communications system 300 may include base station 105-*b* and UE 115-*b*, which may be examples of a base station 105 and a UE 115, as described with reference to FIGS. 1 and 2.

Base station 105-*b* may provide network coverage for geographic area 110-*b*. Base station 105-*b* and UE 115-*b* may communicate using beamformed or directional transmissions similarly as discussed with respect to FIG. 2, however, in this example, uplink transmissions 305 may use uplink beams 310 that are decoupled from downlink beams 320 used for downlink transmissions 315. For example, the UE 115-*b* may identify a particular downlink beam as a preferred receive beam, and may identify a decoupled beam as a preferred uplink beam, which may have different beamforming parameters than the preferred receive beam (e.g., due to MPE considerations). In some cases, to enable decoupled operation, the UE 115-*b* may signal its preferred uplink beams 310 to the base station 105-*b*. For example, in addition to reporting a reference signal received power (RSRP) for a set of beams, the UE 115-*b* may also indicate that beams in the set of reported RSRPs are for uplink. Uplink beams 310 correspond to UE 115-*b* transmission uplink beams 310-*b* and corresponding base station 105-*b* reception uplink beams 310-*b*, and likewise downlink beams 320 correspond to base station 105-*b* transmission downlink beams 320-*a* and corresponding UE 115-*b* reception downlink beams 320-*b*.

In some cases, downlink reference signal sets may be used to detect uplink and downlink beam failure at the UE 115-*b*.

In cases such as illustrated in FIG. 3 with decoupled beams, different reference signal sets may be transmitted by the base station 105-*b*, and may be monitored by the UE 115-*b* to detect beam failure. In some cases, a set of uplink reference signals 325, $q_0^{UL}$, may be configured, and a set of downlink reference signals 330, $q_0^{DL}$, may be configured. The base station 105-*b* may transmit periodic reference signals (e.g., a channel state information reference signal (CSI-RS)) for each set of reference signals using downlink beams. Thus, the base station 105-*b* may transmit periodic reference signal transmissions using downlink beams that are QCL with uplink beams 310 for beam management purposes, such as uplink beam failure detection. The UE 115-*b* may monitor the set of uplink reference signals 325 and identify an uplink beam failure (e.g., based on a RSRP or RSSI of the monitored reference signals dropping below a threshold value). Likewise, the UE 115-*b* may monitor the set of downlink reference signals 330 and identify a downlink beam failure. In some cases, it may be assumed that downlink beams 320 are at least as good as the uplink beams 310 from a channel quality perspective, due to MPE and/or decoupled operation.

In some cases, if the UE 115-*b* detects a failure in downlink beams 320, the UE 115-*b* may transmit, via the uplink transmissions 305 that have not failed in this case, an indication of the downlink beam failure. In some cases, the UE 115-*b* may transmit a special scheduling request (SR) to the base station 105-*b* that includes an indication that the downlink beam 320 has failed (e.g., a bit or flag may be set in the SR to indicate beam failure). Upon receipt of the SR, the base station 105-*b* may identify the downlink beam failure has occurred, and may switch the downlink transmissions 315 to be performed using transmission beams that correspond to uplink beams 310. For example, the base station 105-*b* may switch downlink transmissions 315 to a downlink beam that corresponds to a reference signal associated with $q_0^{UL}$. In such case, downlink communications are continued through a beam switch, and no separate beam recovery process is needed (e.g., identification of a candidate beam, transmission of a RACH message indicating a candidate beam, etc.).

In cases where the UE 115-*b* detects an uplink beam 310 failure, or detects both an uplink beam 310 and downlink beam 320 failure, the UE 115-*b* may initiate a beam recovery procedure to re-establish a connection with the base station 105-*b*. In some cases, the UE 115-*b* may perform a candidate beam search to identify a candidate beam that may support communications between the UE 115-*b* and the base station 105-*b*. In some cases, the UE 115-*b* may perform a candidate beam search on one or more beams associated with a set of uplink beams, $q_1^{UL}$. The UE 115-*b* may then transmit a beam recovery message, such as a RACH message (e.g., MSG1), via an identified candidate beam, to initiate a beam recovery procedure and determine $q_{new}^{UL}$. An advantage of such a technique is that separate resources for downlink candidate beams are not needed, and the resource for the uplink beams may be used in the event that a downlink beam failure occurs.

Figure 4:
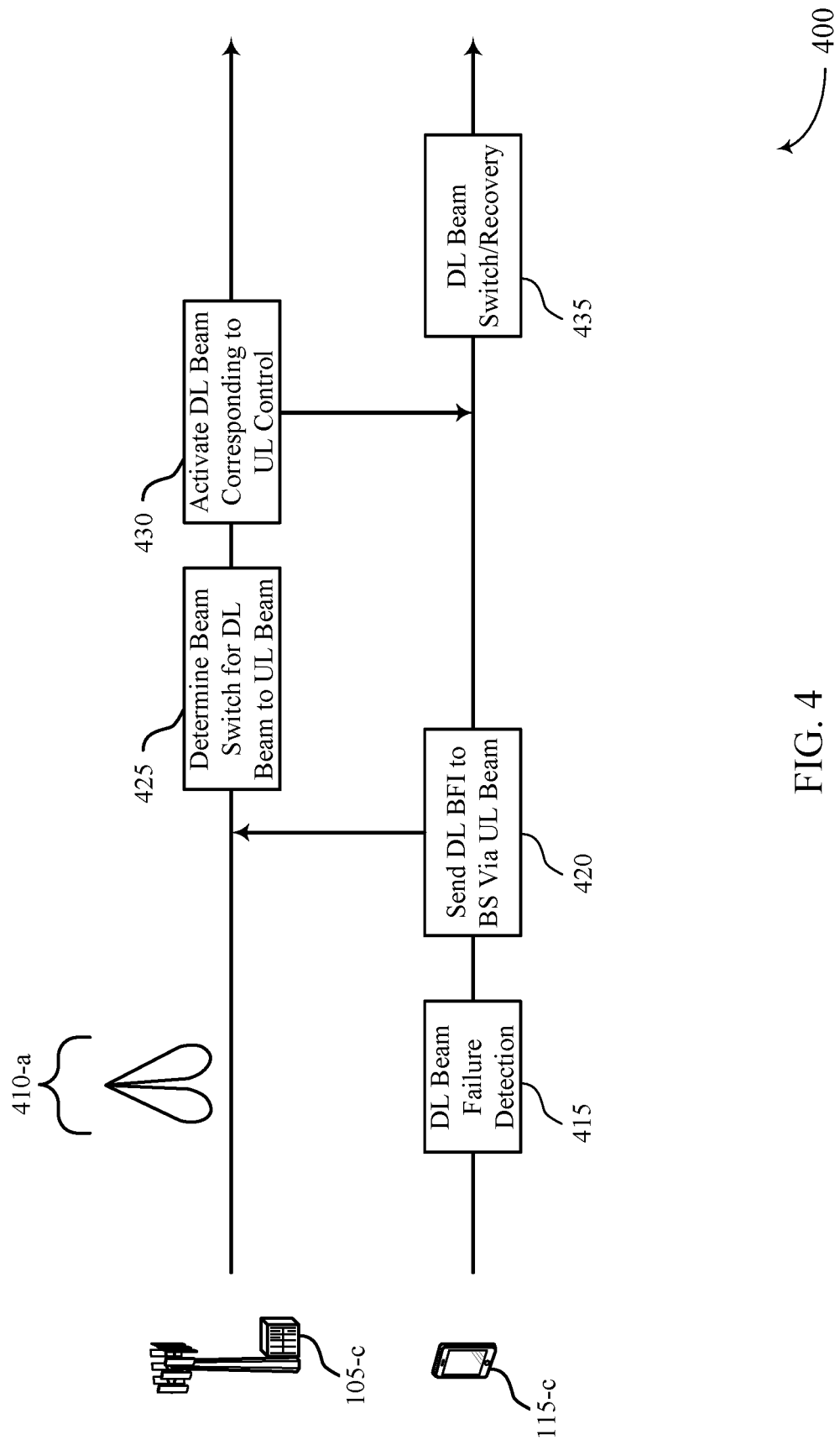
FIG. 4 illustrates an example of a downlink beam recovery using beam recovery techniques in beamformed wireless communications in accordance with aspects of the present disclosure.

FIG. 4 illustrates an example of a downlink beam recovery 400 technique in beamformed wireless communications in accordance with aspects of the present disclosure. In some examples, downlink beam recovery 400 may implement aspects of wireless communications system 100, 200, or 300. In this example, a base station 105-*c* and UE 115-*c* may establish a connection using decoupled uplink and downlink beams, and a failure of the downlink beam may be identified.

For example, the base station 105-*c* may transmit one or more reference signal transmissions via downlink beams 410-*a*, and the UE 115-*c*, at 415, may detect a downlink beam failure based on measurements of the received reference signals. At 420, the UE 115-*a* may transmit a downlink beam failure indication (BFI) to the base station 105-*c* via the uplink beam, which in this case has not failed. In some cases, the downlink BFI may be transmitted via a SR from the UE 115-*c* to the base station 105-*c*. In other cases, a special uplink control message indicating beam failure may be transmitted, or the BFI may be provided using one or more other uplink control information (UCI) messages.

At 425, the base station 105-*c* may, responsive to receiving the BFI for the downlink beam, determine that a beam switch for the downlink beam to the uplink beam parameters is to be performed. At 430, the base station 105-*c* may activate the downlink beam corresponding to the established uplink beam, and may transmit an indication of the activation, or beam switch of the downlink beam, to the UE 115-*c*. In some cases, the beam switch indication may be provided through a physical downlink control channel (PDCCH) transmission that is addressed to a cell radio network temporary identifier (CRNTI) of the UE 115-*c*. The PDCCH transmission may be transmitted using a downlink beam that corresponds to an uplink beam that was used to transmit the BFI. In some cases, the beam switch indication may be transmitted using SR beam sweeping in which the indication is provided using control information transmitted in a beam sweeping procedure. In cases where SR beam sweeping is used, the UE 115-*c* may wait for the response to the BFI in a time division multiplexing (TDM) manner to monitor downlink beam(s) corresponding to the uplink beam used to provide the BFI.

In some cases, the UE 115-*c* may monitor for the beam switch indication from the base station 105-*c*, and in the event that a predetermined period of time elapses without receiving a response, the UE 115-*c* may retransmit the BFI. In some cases, a maximum number of retransmissions, a maximum period of time, or combinations thereof, may be configured, and the UE 115-*c* may determine that the uplink beam has failed as well if the configured maximums are exceeded. In some cases, the UE 115-*c* may continue monitoring control resource sets (CORESETs) transmitted by the base station 105-*c* until an activation command is received for the beam switch. In some cases, the activation command may be provided in a medium access control (MAC) control element (MAC-CE) from the base station 105-*c*. In some cases, the UE 115-*c* may identify a number of beams that are to be monitored for the CORESET transmissions, and may use a priority rule to down-select the number of monitored beams. For example, the priority rule may be based on periodicity of CORESET transmissions, a CORESET type, a CORESET identification, channel conditions of the beams (e.g., RSSI, RSRP, signal to noise ratio (SNR), etc.), or any combinations thereof. Upon receiving the activation command, the downlink beam will be switched and recovered at the UE 115-*c*, as indicated at 435.

Figure 5:
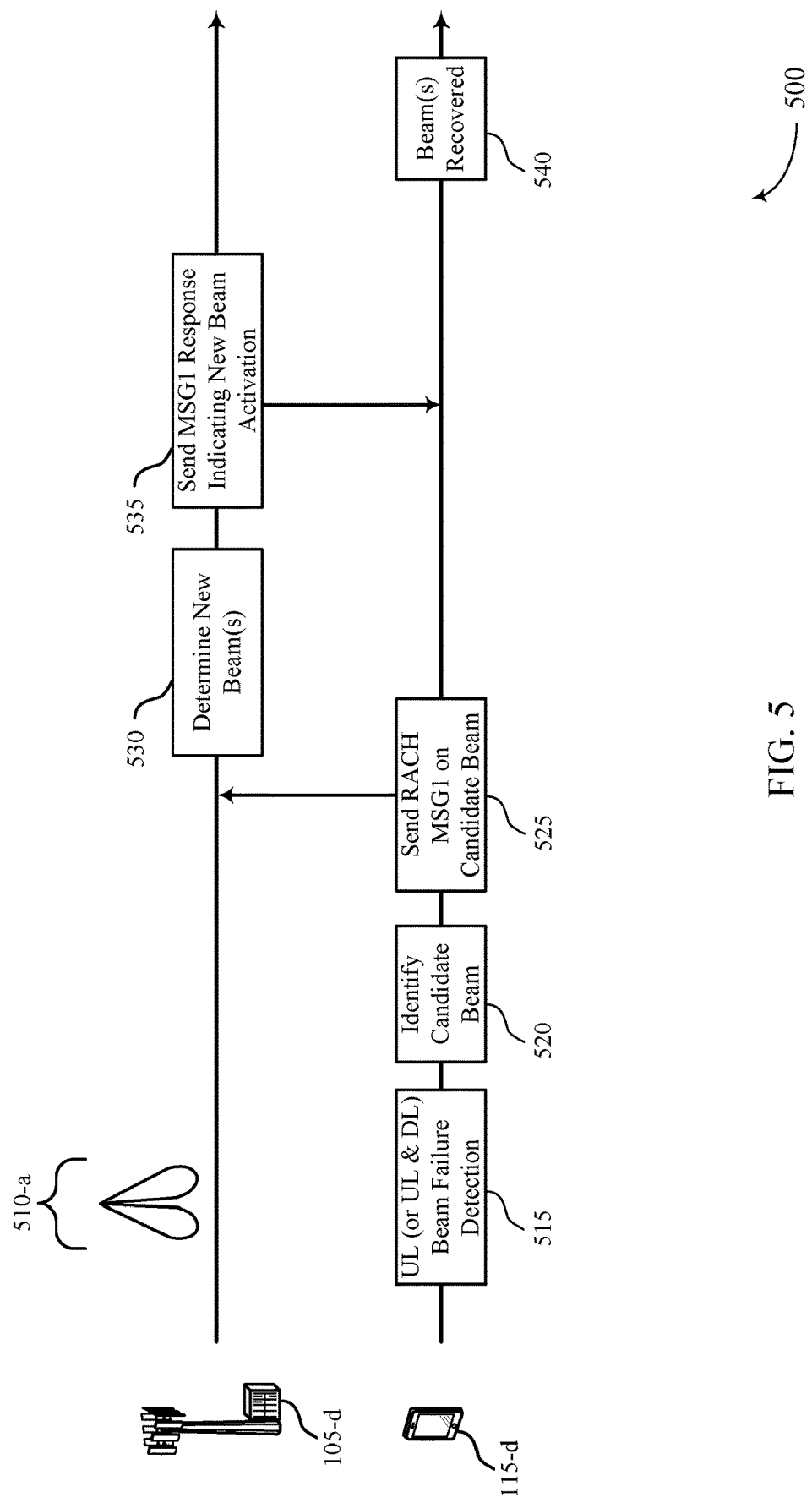
FIG. 5 illustrates an example of an uplink beam recovery using beam recovery techniques in beamformed wireless communications in accordance with aspects of the present disclosure.

FIG. 5 illustrates an example of an uplink beam recovery 500 that supports beam recovery techniques in beamformed wireless communications in accordance with aspects of the present disclosure. In some examples, uplink beam recovery 500 may implement aspects of wireless communications system 100, 200, or 300. In this example, a base station 105-*d* and UE 115-*d* may establish a connection using decoupled uplink and downlink beams, and a failure of the uplink beam may be identified. In some cases, the technique in this example may also be used in cases where the UE 115-*d* identifies a failure in both the uplink and downlink beam.

For example, the base station 105-*d* may transmit one or more reference signal transmissions via downlink beams 510-*a* that are QCL with the uplink beam established between the UE 115-*d* and the base station 105-*d*. The UE 115-*d*, at 515, may detect an uplink beam failure based on measurements of the received reference signals. At 520, the UE 115-*d* may identify a candidate beam for use in transmitting a beam recovery message. In some cases, the UE 115-*d* may identify the candidate beam based on one or more reference signal measurements of a set of uplink beams (e.g., $q_1^{UL}$). At 525, the UE 115-*d* may transmit a beam recovery message, such as a RACH message, using the identified candidate beam. In some cases, a RACH MSG1 may be transmitted that indicates the uplink beam failure (or uplink and downlink beam failure).

At 530, the base station 105-*d* may determine a new beam for communications with the UE 115-*d*. The new beam may be a new uplink beam, or both a new uplink beam and a new downlink beam, and may be determined based at least in part on the identified candidate beam used to transmit the beam recovery message. At 535, the base station 105-*d* may transmit a response to the UE 115-*d*, such as a RACH message response indicating activation of the new beam. In some cases, the RACH response may be transmitted using resources within a search space that is reserved for uplink beam recovery messages (e.g., a separate recoverySearchSpace that is different than a search space for an initial access procedure), and the UE 115-*d* may monitor the search space for a downlink control transmission (e.g., PDCCH transmission) with beam activation. In other cases, the beam recovery response may be provided in a downlink control transmission (i.e., using the existing downlink beam in cases where the downlink beam had not failed) that may have, for example, a unique format (e.g., a unique downlink control information (DCI) format) or scrambling (e.g., scrambled with the UE's RNTI or CRNTI), or a special MAC-CE based activation may be transmitted. In some cases, a time window (e.g., a certain number of symbols or a period of time) may be identified (e.g., a specified time window in a wireless communications standard) after receiving the recovery response where the uplink beam is deemed to be recovered and the UE may start using it. In some cases, the UE 115-*d* may transmit an acknowledgment of the new beam activation, which may be transmitted on the new beam. Such an acknowledgment, in some cases, may be different from an acknowledgment of MAC-CE activation commands that are not for beam recovery (e.g., the acknowledgment may include a different field or information). Upon receiving the new beam activation command, the uplink (or uplink and downlink) beam will be switched and recovered at the UE 115-*d*, as indicated at 540. Such techniques thus advantageously provide for efficient detection of beam failures and efficient recovery from such failures, which may thus enhance the efficiency and reliability of a wireless communications system.

Figure 6:
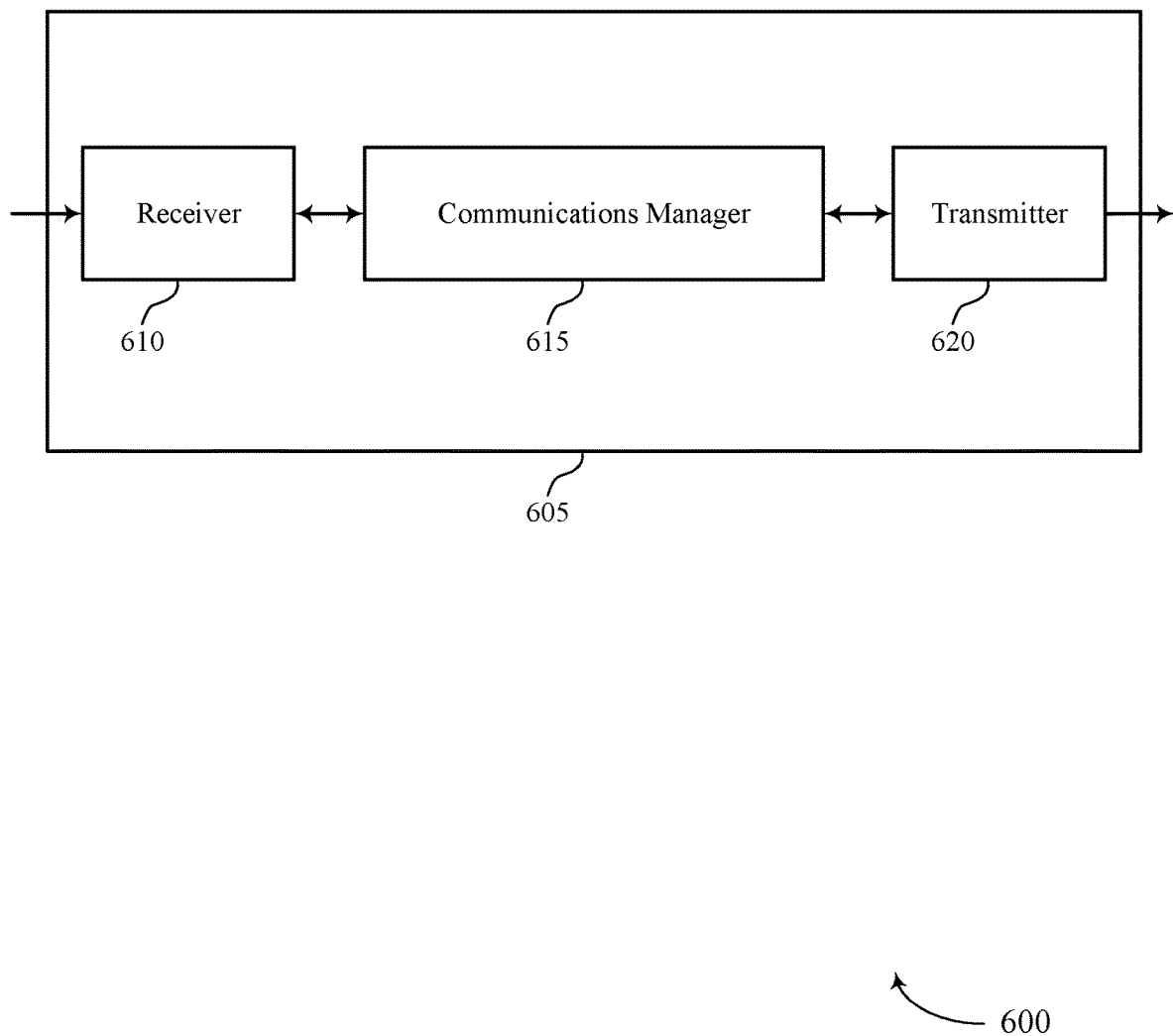
FIGS. 6 and 7 show block diagrams of devices that support beam recovery techniques in beamformed wireless communications in accordance with aspects of the present disclosure.

FIG. 6 shows a block diagram 600 of a device 605 that supports beam recovery techniques in beamformed wireless communications in accordance with aspects of the present disclosure. The device 605 may be an example of aspects of a UE 115 as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to beam recovery techniques in beamformed wireless communications, etc.). Information may be passed on to other components of the device 605. The receiver 610 may be an example of aspects of the transceiver 920 described with reference to FIG. 9. The receiver 610 may utilize a single antenna or a set of antennas.

The communications manager 615 may establish a connection with a base station via a downlink beam for transmissions from the base station to the UE and an uplink beam for transmissions from the UE to the base station, determine that a beam failure of the downlink beam has occurred, transmit a beam failure indication (e.g., a SR) to the base station that indicates the beam failure of the downlink beam, and monitor, responsive to the beam failure indication, for control information that is scrambled with a unique sequence associated with the UE.

The communications manager 615 may also establish a connection with a base station via a first downlink beam for transmissions from the base station to the UE and a first uplink beam for transmissions from the UE to the base station, where the first downlink beam and the first uplink beam are decoupled beams that use different beamforming parameters, monitor a first set of reference signals transmitted by the base station via a first set of beams associated with the first downlink beam, and a second set of reference signals transmitted by the base station via a second set of beams associated with the first uplink beam, determine, based on the monitoring, a beam failure of the first uplink beam, or both the first uplink beam and the first downlink beam, has occurred, and transmit a beam failure indication to the base station that indicates the beam failure of the first uplink beam or both the first uplink beam and the first downlink beam. The communications manager 615 may be an example of aspects of the communications manager 910 described herein.

The communications manager 615 may as described herein be implemented to realize one or more potential advantages. One implementation may allow the device 605 to save power and increase battery life by communicating beam failure and performing beam recovery more efficiently. For example, the device 605 may switch beams upon failure of a downlink beam relatively quickly, thereby reducing latency in communications.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

Figure 7:
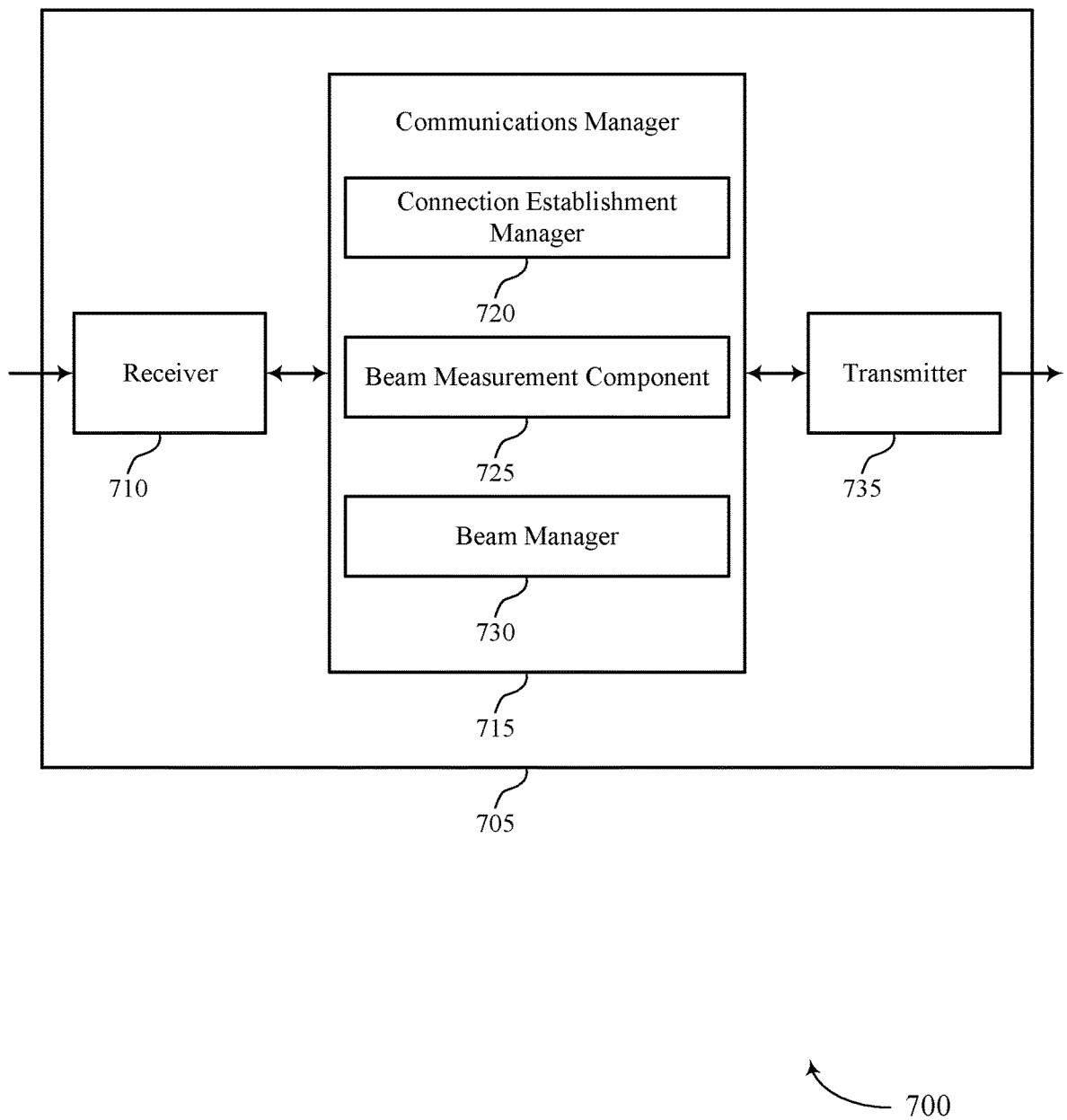

FIG. 7 shows a block diagram 700 of a device 705 that supports beam recovery techniques in beamformed wireless communications in accordance with aspects of the present disclosure. The device 705 may be an example of aspects of a device 605, or a UE 115 as described herein. The device 705 may include a receiver 710, a communications manager 715, and a transmitter 735. The device 705 may also include a processor. Each of these components may be in communication with one another (e.g., via one or more buses).

The receiver 710 may receive information such as packets, user data, or control information associated with various information channels (e.g., control channels, data channels, and information related to beam recovery techniques in beamformed wireless communications, etc.). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include a connection establishment manager 720, a beam measurement component 725, and a beam manager 730. The communications manager 715 may be an example of aspects of the communications manager 910 described herein.

The connection establishment manager 720 may establish a connection with a base station via a downlink beam for transmissions from the base station to the UE and an uplink beam for transmissions from the UE to the base station. In some cases, the downlink beam and the uplink beam are decoupled beams that use different beamforming parameters.

The beam measurement component 725 may determine that a beam failure of the downlink beam has occurred. In some cases, the beam measurement component 725 may monitor a first set of reference signals transmitted by the base station via a first set of beams associated with the first downlink beam, and a second set of reference signals transmitted by the base station via a second set of beams associated with the first uplink beam.

The beam manager 730 may transmit a beam failure indication to the base station that indicates the beam failure of the downlink beam and switch beamforming parameters associated with the downlink beam to correspond to beamforming parameters of the uplink beam. In some cases, the beam manager 730 may determine, based on the monitoring the sets of reference signals, a beam failure of the first uplink beam, or both the first uplink beam and the first downlink beam, has occurred and transmit a beam failure indication to the base station that indicates the beam failure of the first uplink beam or both the first uplink beam and the first downlink beam.

The transmitter 735 may transmit signals generated by other components of the device 705. In some examples, the transmitter 735 may be collocated with a receiver 710 in a transceiver module. For example, the transmitter 735 may be an example of aspects of the transceiver 920 described with reference to FIG. 9. The transmitter 735 may utilize a single antenna or a set of antennas.

Figure 8:
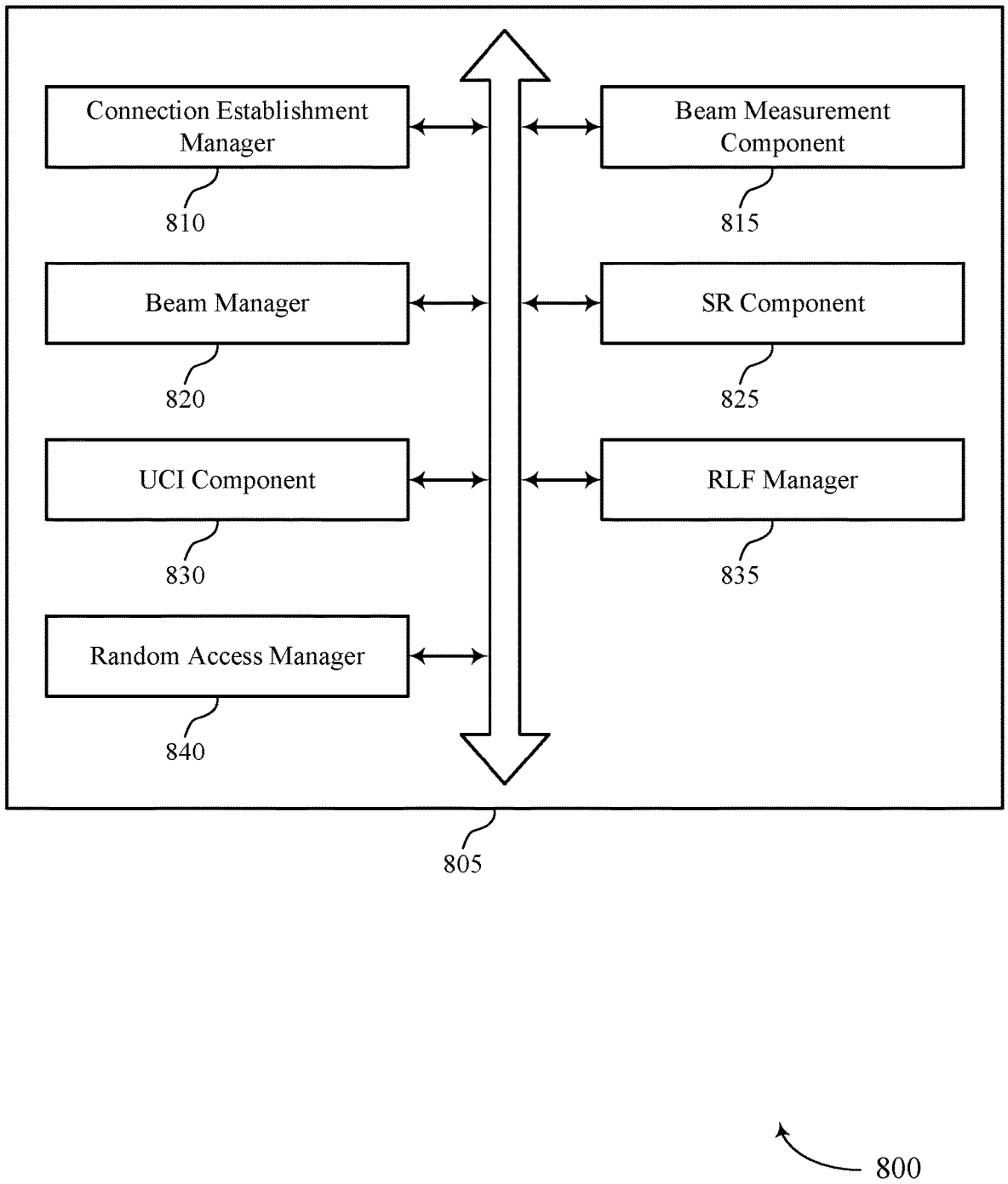
FIG. 8 shows a block diagram of a communications manager that supports beam recovery techniques in beamformed wireless communications in accordance with aspects of the present disclosure.

FIG. 8 shows a block diagram 800 of a communications manager 805 that supports beam recovery techniques in beamformed wireless communications in accordance with aspects of the present disclosure. The communications manager 805 may be an example of aspects of a communications manager 615, a communications manager 715, or a communications manager 910 described herein. The communications manager 805 may include a connection establishment manager 810, a beam measurement component 815, a beam manager 820, a SR component 825, an UCI component 830, a RLF manager 835, and a random access manager 840. Each of these modules may communicate, directly or indirectly, with one another (e.g., via one or more buses).

The connection establishment manager 810 may establish a connection with a base station via a downlink beam for transmissions from the base station to the UE and an uplink beam for transmissions from the UE to the base station. In some cases, the downlink beam and the uplink beam are decoupled beams that use different beamforming parameters.

The beam measurement component 815 may determine that a beam failure of the downlink beam has occurred. In some examples, the beam measurement component 815 may monitor a first set of reference signals transmitted by the base station via a first set of beams associated with the first downlink beam, and a second set of reference signals transmitted by the base station via a second set of beams associated with the first uplink beam. In some examples, the beam measurement component 815 may determine that a parameter of one or more reference signals of the first set of reference signals is below a threshold value. In some examples, the beam measurement component 815 may receive, from the base station, control information that indicates the first set of reference signals associated with the downlink beam and the second set of reference signals associated with the uplink beam. In some examples, the beam measurement component 815 may monitor a predetermined search space for a response message or control information from the base station that activates a different uplink beam, a different downlink beam, or any combinations thereof, for subsequent communications between the UE and the base station. In some cases, the control information is scrambled with a unique sequence (e.g., a RNTI or CRNTI of the UE) that is monitored by the UE for a predetermined time after sending a beam failure indication.

In some examples, the beam measurement component 815 may measure, responsive to determining the beam failure, one or more parameters of the second set of beams. In some examples, the beam measurement component 815 may identify a second uplink beam based on the measuring, and where the beam failure indication is transmitted via the second uplink beam.

In some cases, the determining the beam failure of the downlink beam is based on one or more of a reference signal received power (RSRP), signal to interference and noise ratio (SINR), or any combinations thereof, of one or more reference signal transmissions via the downlink beam. In some cases, the beam failure of the first uplink beam is a function of one or more uplink parameters associated with the first uplink beam, the one or more uplink parameters including one or more of an uplink transmission power, a modulation and coding scheme (MCS), a modulation order, a coding rate, or any combinations thereof.

The beam manager 820 may transmit a beam failure indication of a downlink beam to the base station, via the uplink beam, that indicates the beam failure of the downlink beam. In some examples, beam switching may be performed responsive to the downlink beam failure, and the UE may switch beamforming parameters associated with the downlink beam to correspond to beamforming parameters of the uplink beam.

In some examples, the beam manager 820 may determine, based on reference signal or beam monitoring, a beam failure of the first uplink beam, or both the first uplink beam and the first downlink beam, has occurred. In some examples, the beam manager 820 may transmit a beam failure indication to the base station that indicates the beam failure of the first uplink beam or both the first uplink beam and the first downlink beam. In some examples, the beam manager 820 may receive, responsive to the beam failure indication, a beam switch command from the base station that indicates that the beamforming parameters associated with the downlink beam are to be switched to correspond to beamforming parameters of the uplink beam.

In some examples, the beam manager 820 may monitor for a beam switch command from the base station. In some examples, the beam manager 820 may retransmit the beam failure indication to the base station responsive to determining that a predetermined time period has elapsed without receiving the beam switch command. In some examples, the beam manager 820 may monitor, prior to the switching the beamforming parameters, for one or more CORESET transmissions from the base station via the downlink beam. In some examples, the beam manager 820 may identify that a number of CORESETs transmitted via the one or more beams associated with the uplink beam exceed a predetermined number of CORESETs. In some examples, the beam manager 820 may down-select the number of CORESETs based on a priority rule for CORESET monitoring. In some cases, the priority rule is based on one or more or a periodicity of CORESET transmissions, a CORESET identification, a type of CORESET, a channel quality metric associated with each CORESET transmission, or any combination thereof.

In some examples, the beam manager 820 may receive a beam switch command from the base station that indicates that the beamforming parameters associated with the downlink beam are to be switched to correspond to beamforming parameters of the uplink beam. In some examples, the beam manager 820 may receive, from the base station, a response message indicating that the second uplink beam is to be used for subsequent communications with the UE.

The SR component 825 may transmit a scheduling request (SR) to the base station, via the uplink beam, that includes one or more bits that indicate the beam failure of the downlink beam. In some cases, the beam failure indication is transmitted in a scheduling request (SR) beam sweeping operation of the base station, and where the monitoring is performed using time division multiplexing according to the SR beam sweeping operation.

The UCI component 830 may transmit the beam failure indication in a PUCCH transmission via the uplink beam. The RLF manager 835 may declare a radio link failure (RLF) based on the UE performing a maximum number of retransmissions of the beam failure indication.

In some cases, the beam failure indication and the response message are RACH messages. The random access manager 840 may transmit to the base station, responsive to the received response message, an acknowledgment that indicates the UE successfully received the response message, where the acknowledgment is transmitted via the second uplink beam.

In some cases, the response message is transmitted via a downlink control channel transmission having one or more of a control information format associated with a changed uplink transmission beam, an applied scrambling sequence associated with a changed uplink transmission beam, a special medium access control (MAC) control element (MAC-CE) associated with a changed uplink transmission beam, or any combinations thereof.

Figure 9:
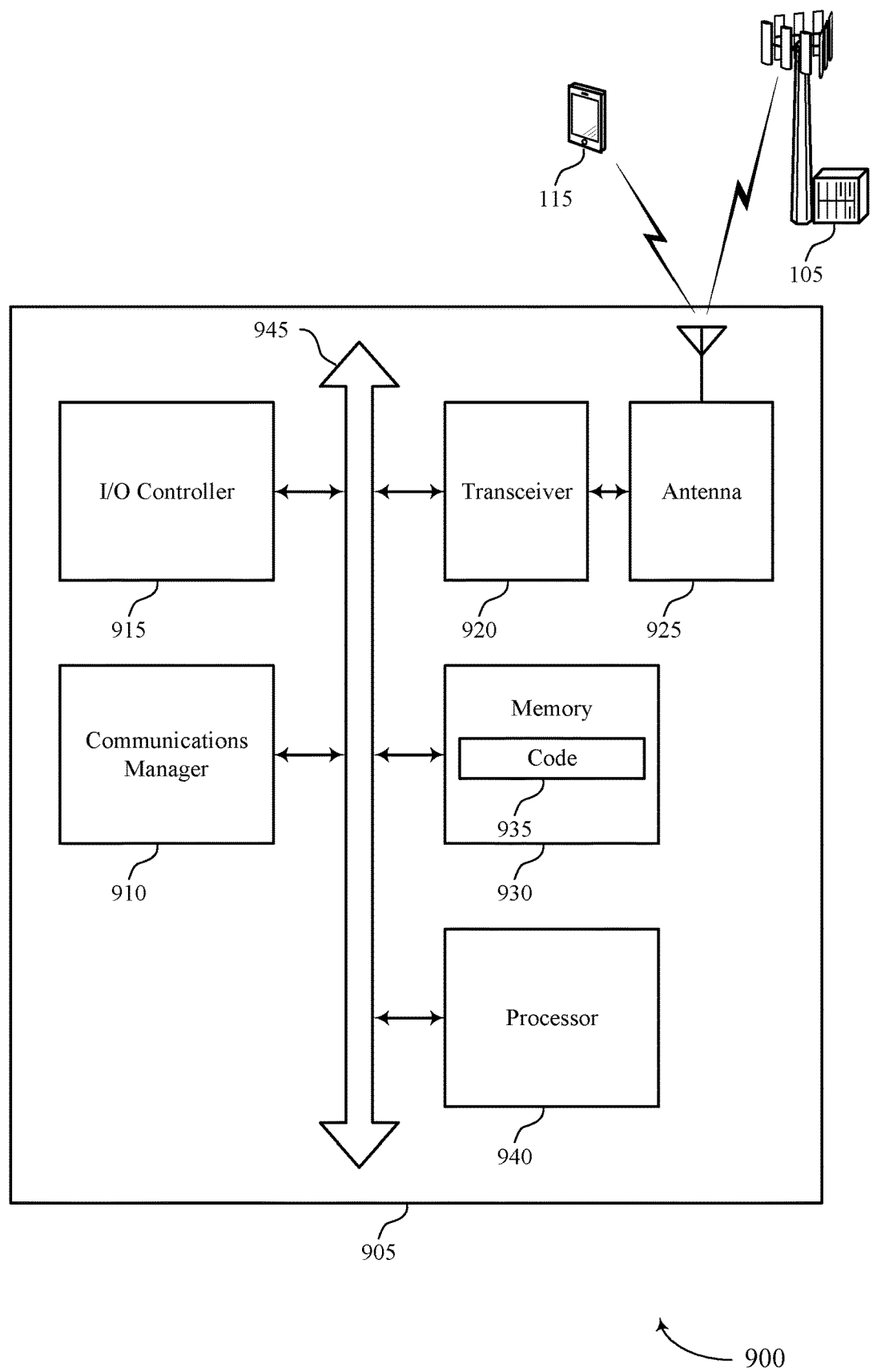
FIG. 9 shows a diagram of a system including a device that supports beam recovery techniques in beamformed wireless communications in accordance with aspects of the present disclosure.

FIG. 9 shows a diagram of a system 900 including a device 905 that supports beam recovery techniques in beamformed wireless communications in accordance with aspects of the present disclosure. The device 905 may be an example of or include the components of device 605, device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus 945).

The communications manager 910 may establish a connection with a base station via a downlink beam for transmissions from the base station to the UE and an uplink beam for transmissions from the UE to the base station, determine that a beam failure of the downlink beam has occurred, transmit a beam failure indication to the base station that indicates the beam failure of the downlink beam, and monitor, responsive to the beam failure indication, for control information that is scrambled with a unique sequence associated with the UE.

The communications manager 910 may also establish a connection with a base station via a first downlink beam for transmissions from the base station to the UE and a first uplink beam for transmissions from the UE to the base station, where the first downlink beam and the first uplink beam are decoupled beams that use different beamforming parameters, monitor a first set of reference signals transmitted by the base station via a first set of beams associated with the first downlink beam, and a second set of reference signals transmitted by the base station via a second set of beams associated with the first uplink beam, determine, based on the monitoring, a beam failure of the first uplink beam, or both the first uplink beam and the first downlink beam, has occurred, and transmit a beam failure indication to the base station that indicates the beam failure of the first uplink beam or both the first uplink beam and the first downlink beam.

The device 905 may as described herein be implemented to realize one or more potential advantages. One implementation may allow the device 905 to save power and increase battery life by communicating beam failure and performing beam recovery more efficiently. For example, the device 905 may switch beams upon failure of a downlink and/or uplink beam relatively quickly, thereby reducing latency in communications.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include RAM and ROM. The memory 930 may store computer-readable, computer-executable code 935 including instructions that, when executed, cause the processor to perform various functions described herein. In some cases, the memory 930 may contain, among other things, a BIOS which may control basic hardware or software operation such as the interaction with peripheral components or devices.

The processor 940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting beam recovery techniques in beamformed wireless communications).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
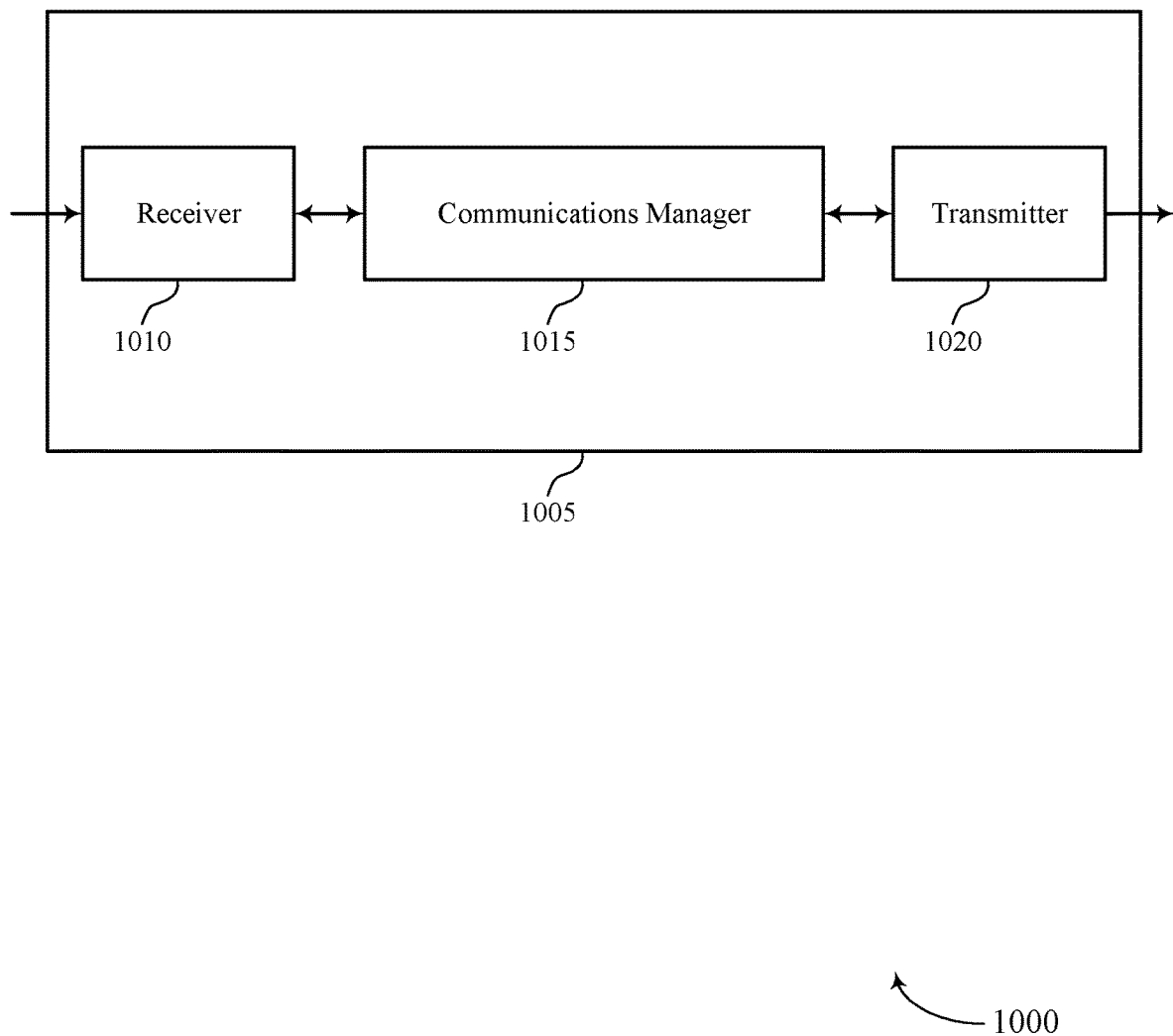
FIGS. 10 and 11 show block diagrams of devices that support beam recovery techniques in beamformed wireless communications in accordance with aspects of the present disclosure.

FIG. 10 shows a block diagram 1000 of a device 1005 that supports beam recovery techniques in beamformed wireless communications in accordance with aspects of the present disclosure. The device 1005 may be an example of aspects of a base station 105 as described herein. The device 1005 may include a receiver 1010, a communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to beam recovery techniques in beamformed wireless communications, etc.). Information may be passed on to other components of the device 1005.

The receiver 1010 may be an example of aspects of the transceiver 1320 described with reference to FIG. 13. The receiver 1010 may utilize a single antenna or a set of antennas.

The communications manager 1015 may establish a connection with a UE via a downlink beam for transmissions from the base station to the UE and an uplink beam for transmissions from the UE to the base station, receive a beam failure indication from the UE that indicates a beam failure of the downlink beam at the UE, and transmit control information to the UE to switch beamforming parameters associated with the downlink beam, where the control information is scrambled with a unique sequence (e.g., RNTI or CRNTI) associated with the UE.

The communications manager 1015 may also establish a connection with a UE via a first downlink beam for transmissions from the base station to the UE and a first uplink beam for transmissions from the UE to the base station, where the first downlink beam and the first uplink beam are decoupled beams that use different beamforming parameters, configure the UE to monitor a first set of reference signals for transmission via a first set of beams associated with the first downlink beam, and a second set of reference signals for transmission via a second set of beams associated with the first uplink beam, transmit the first set of reference signals and the second set of reference signals, receive a beam failure indication from the UE that indicates a beam failure of the first uplink beam or both the first uplink beam and the first downlink beam, and activate, responsive to the beam failure indication, a second uplink beam for subsequent communications with the UE. The communications manager 1015 may be an example of aspects of the communications manager 1310 described herein.

The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
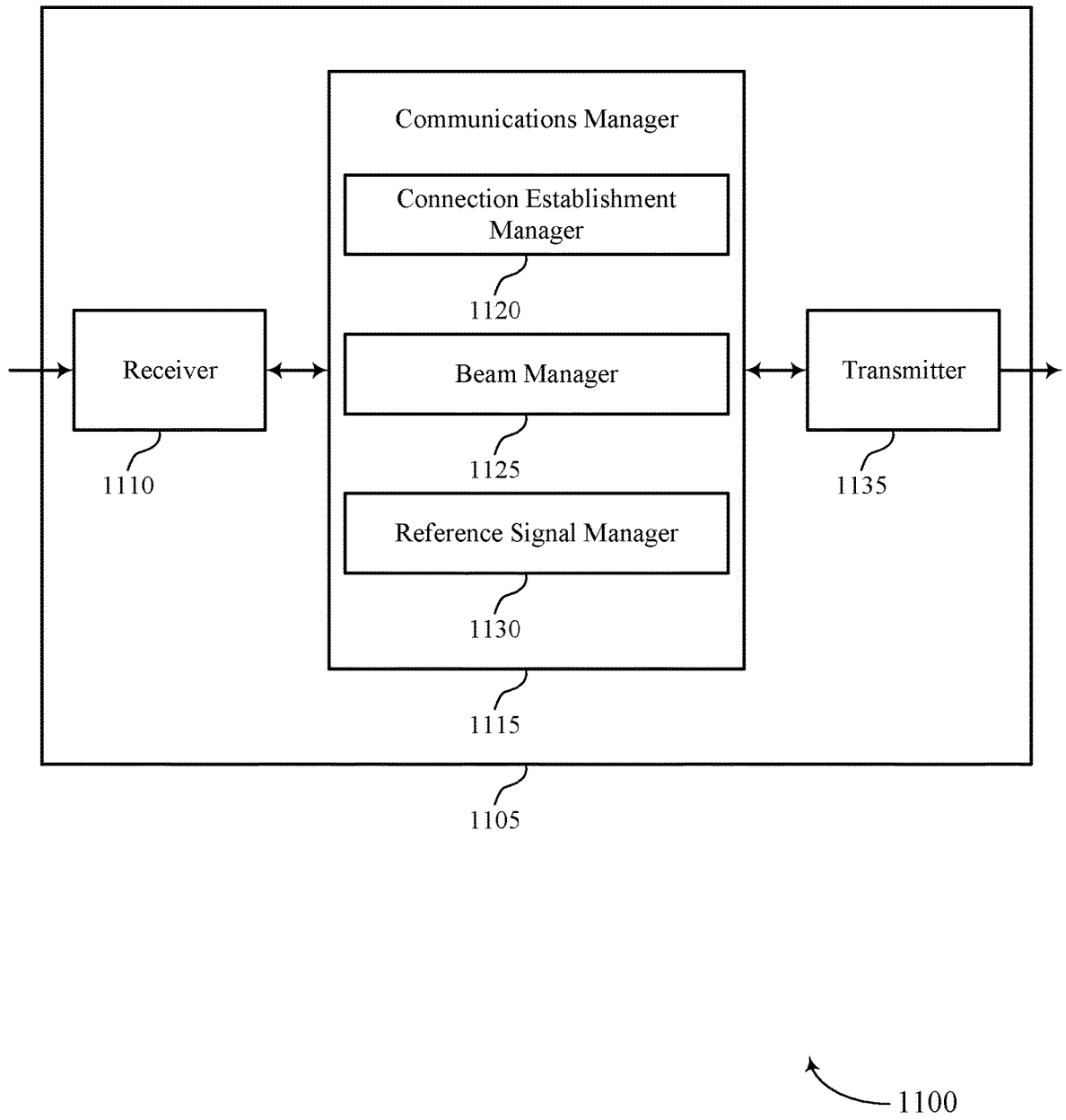

FIG. 11 shows a block diagram 1100 of a device 1105 that supports beam recovery techniques in beamformed wireless communications in accordance with aspects of the present disclosure. The device 1105 may be an example of aspects of a device 1005, or a base station 105 as described herein. The device 1105 may include a receiver 1110, a communications manager 1115, and a transmitter 1135. The device 1105 may also include a processor. Each of these components may be in communication with one another (e.g., via one or more buses).

The receiver 1110 may receive information such as packets, user data, or control information associated with various information channels (e.g., control channels, data channels, and information related to beam recovery techniques in beamformed wireless communications, etc.). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include a connection establishment manager 1120, a beam manager 1125, and a reference signal manager 1130. The communications manager 1115 may be an example of aspects of the communications manager 1310 described herein.

The connection establishment manager 1120 may establish a connection with a UE via a downlink beam for transmissions from the base station to the UE and an uplink beam for transmissions from the UE to the base station. In some cases, the downlink beam and the uplink beam are decoupled beams that use different beamforming parameters.

The beam manager 1125 may receive a beam failure indication from the UE that indicates a beam failure of the downlink beam at the UE and transmit control information to the UE to switch beamforming parameters associated with the downlink beam, where the control information is scrambled with a unique sequence (e.g., RNTI) associated with the UE. In some cases, the beam manager 1125 may receive a beam failure indication from the UE that indicates a beam failure of the first uplink beam or both the first uplink beam and the first downlink beam and activate, responsive to the beam failure indication, a second uplink beam for subsequent communications with the UE.

The reference signal manager 1130 may configure the UE to monitor a first set of reference signals for transmission via a first set of beams associated with the first downlink beam, and a second set of reference signals for transmission via a second set of beams associated with the first uplink beam and transmit the first set of reference signals and the second set of reference signals.

The transmitter 1135 may transmit signals generated by other components of the device 1105. In some examples, the transmitter 1135 may be collocated with a receiver 1110 in a transceiver module. For example, the transmitter 1135 may be an example of aspects of the transceiver 1320 described with reference to FIG. 13. The transmitter 1135 may utilize a single antenna or a set of antennas.

Figure 12:
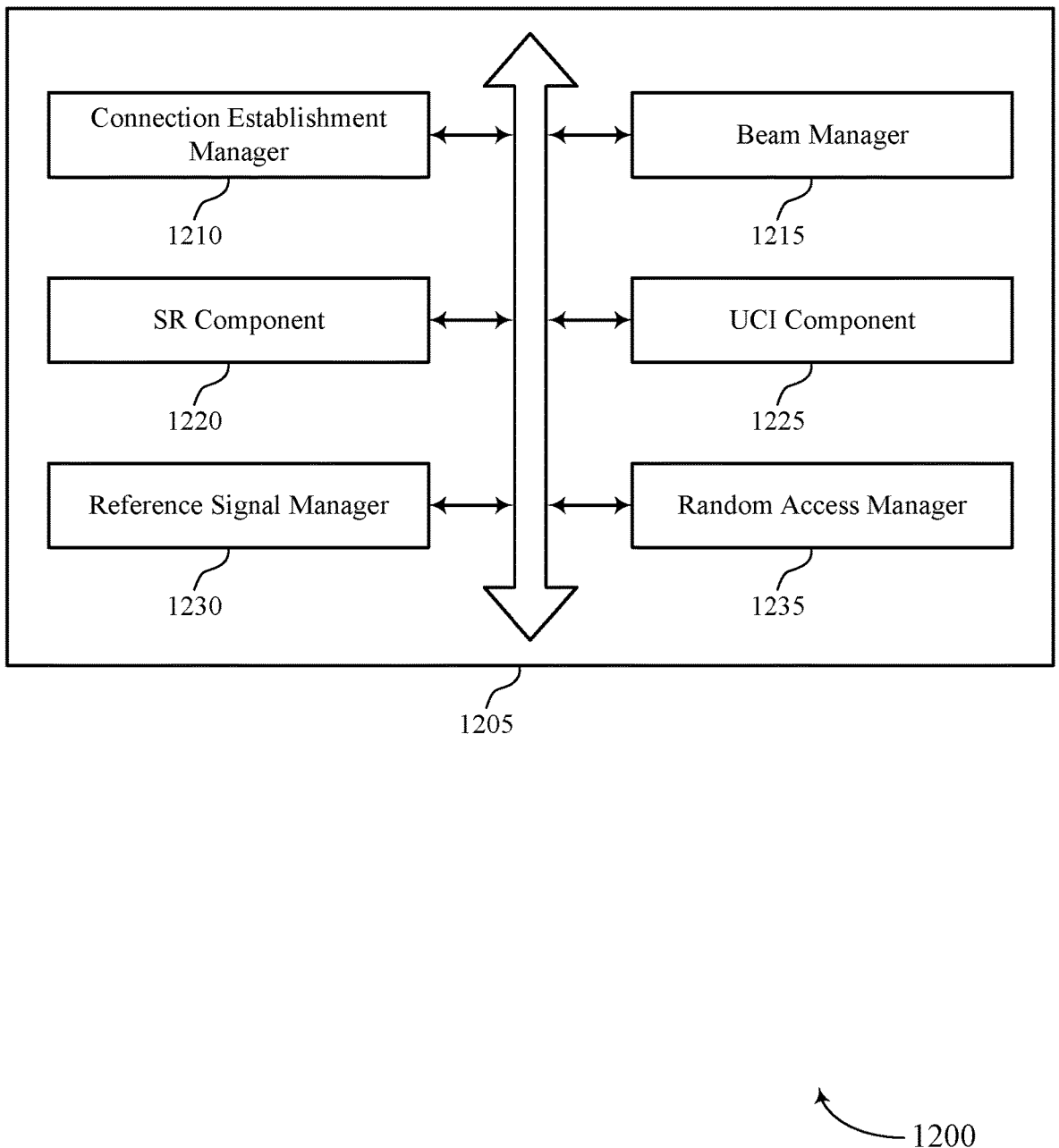
FIG. 12 shows a block diagram of a communications manager that supports beam recovery techniques in beamformed wireless communications in accordance with aspects of the present disclosure.

FIG. 12 shows a block diagram 1200 of a communications manager 1205 that supports beam recovery techniques in beamformed wireless communications in accordance with aspects of the present disclosure. The communications manager 1205 may be an example of aspects of a communications manager 1015, a communications manager 1115, or a communications manager 1310 described herein. The communications manager 1205 may include a connection establishment manager 1210, a beam manager 1215, a SR component 1220, an UCI component 1225, a reference signal manager 1230, and a random access manager 1235. Each of these modules may communicate, directly or indirectly, with one another (e.g., via one or more buses).

The connection establishment manager 1210 may establish a connection with a UE via a downlink beam for transmissions from the base station to the UE and an uplink beam for transmissions from the UE to the base station. In some cases, the downlink beam and the uplink beam are decoupled beams that use different beamforming parameters. In some examples, the connection establishment manager 1210 may establish a connection with a UE via a first downlink beam for transmissions from the base station to the UE and a first uplink beam for transmissions from the UE to the base station, where the first downlink beam and the first uplink beam are decoupled beams that use different beamforming parameters.

The beam manager 1215 may receive a beam failure indication from the UE via the uplink beam that indicates a beam failure of the downlink beam at the UE. In some examples, the beam manager 1215 may transmit an indication to the UE to switch beamforming parameters associated with the downlink beam to correspond to beamforming parameters of the uplink beam. In some cases, the indication to the UE to switch beamforming parameters includes a beam switch command that is transmitted to the UE.

In some examples, the beam manager 1215 may receive a beam failure indication from the UE that indicates a beam failure of the first uplink beam or both the first uplink beam and the first downlink beam. In some examples, the beam manager 1215 may activate, responsive to the beam failure indication, a second uplink beam for subsequent communications with the UE. In some examples, the beam manager 1215 may transmit, using downlink resources within a predetermined search space, a response message to the UE that activates the second uplink beam, a second downlink beam, or any combinations thereof, for subsequent communications between the UE and the base station.

The reference signal manager 1230 may configure the UE to monitor a first set of reference signals for transmission via a first set of beams associated with the first downlink beam, and a second set of reference signals for transmission via a second set of beams associated with the first uplink beam. In some examples, the reference signal manager 1230 may transmit the first set of reference signals and the second set of reference signals. In some examples, the reference signal manager 1230 may transmit a second set of reference signals via a second set of beams associated with the uplink beams, and where the beam failure indication indicates a parameter of one or more reference signals of the first set of reference signals as measured at the UE is below a threshold value. In some cases, the beam failure indication is received via a second uplink beam, and where the second uplink beam is within the second set of beams.

The SR component 1220 may receive a scheduling request (SR) from the UE, via the uplink beam, that includes one or more bits that indicate the beam failure of the downlink beam. In some cases, the beam failure indication is received in a SR beam sweeping operation of the base station, and where the beam switch command is transmitted according to the SR beam sweeping operation.

The UCI component 1225 may receive the beam failure indication in a PUCCH transmission from the UE via the uplink beam. In some cases, the beam failure indication from the UE, and a response message transmitted by the base station that activates the second uplink beam, are RACH messages. The random access manager 1235 may receive, responsive to transmitting the response message, an acknowledgment from the UE that indicates the UE successfully received the response message, where the acknowledgment is transmitted via the second uplink beam. In some cases, the response message is transmitted via a downlink control channel transmission having one or more of a control information format associated with a changed uplink transmission beam, an applied scrambling sequence associated with a changed uplink transmission beam, a special medium access control (MAC) control element (MAC-CE) associated with a changed uplink transmission beam, or any combinations thereof.

Figure 13:
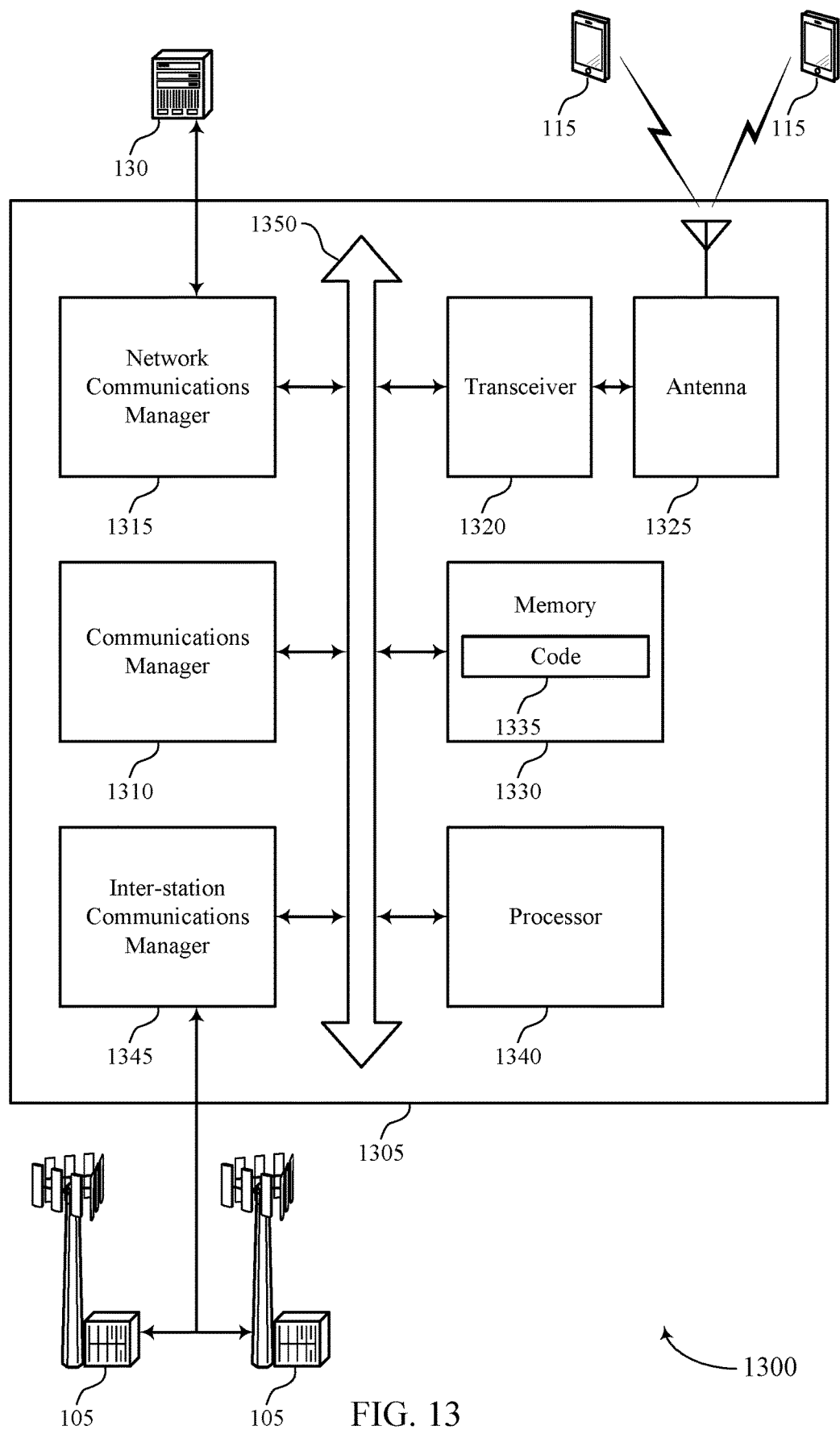
FIG. 13 shows a diagram of a system including a device that supports beam recovery techniques in beamformed wireless communications in accordance with aspects of the present disclosure.

FIG. 13 shows a diagram of a system 1300 including a device 1305 that supports beam recovery techniques in beamformed wireless communications in accordance with aspects of the present disclosure. The device 1305 may be an example of or include the components of device 1005, device 1105, or a base station 105 as described herein. The device 1305 may include components for bi-directional voice and data communications including components for transmitting and receiving communications, including a communications manager 1310, a network communications manager 1315, a transceiver 1320, an antenna 1325, memory 1330, a processor 1340, and an inter-station communications manager 1345. These components may be in electronic communication via one or more buses (e.g., bus 1350).

The communications manager 1310 may establish a connection with a UE via a downlink beam for transmissions from the base station to the UE and an uplink beam for transmissions from the UE to the base station, where the downlink beam and the uplink beam are decoupled beams that use different beamforming parameters, receive a beam failure indication from the UE via the uplink beam that indicates a beam failure of the downlink beam at the UE, and transmit an indication to the UE to switch beamforming parameters associated with the downlink beam to correspond to beamforming parameters of the uplink beam.

The communications manager 1310 may also establish a connection with a UE via a first downlink beam for transmissions from the base station to the UE and a first uplink beam for transmissions from the UE to the base station, where the first downlink beam and the first uplink beam are decoupled beams that use different beamforming parameters, configure the UE to monitor a first set of reference signals for transmission via a first set of beams associated with the first downlink beam, and a second set of reference signals for transmission via a second set of beams associated with the first uplink beam, transmit the first set of reference signals and the second set of reference signals, receive a beam failure indication from the UE that indicates a beam failure of the first uplink beam or both the first uplink beam and the first downlink beam, and activate, responsive to the beam failure indication, a second uplink beam for subsequent communications with the UE.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM, ROM, or a combination thereof. The memory 1330 may store computer-readable code 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some cases, a memory controller may be integrated into processor 1340. The processor 1340 may be configured to execute computer-readable instructions stored in a memory (e.g., the memory 1330) to cause the device 1305 to perform various functions (e.g., functions or tasks supporting beam recovery techniques in beamformed wireless communications).

The inter-station communications manager 1345 may manage communications with other base station 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
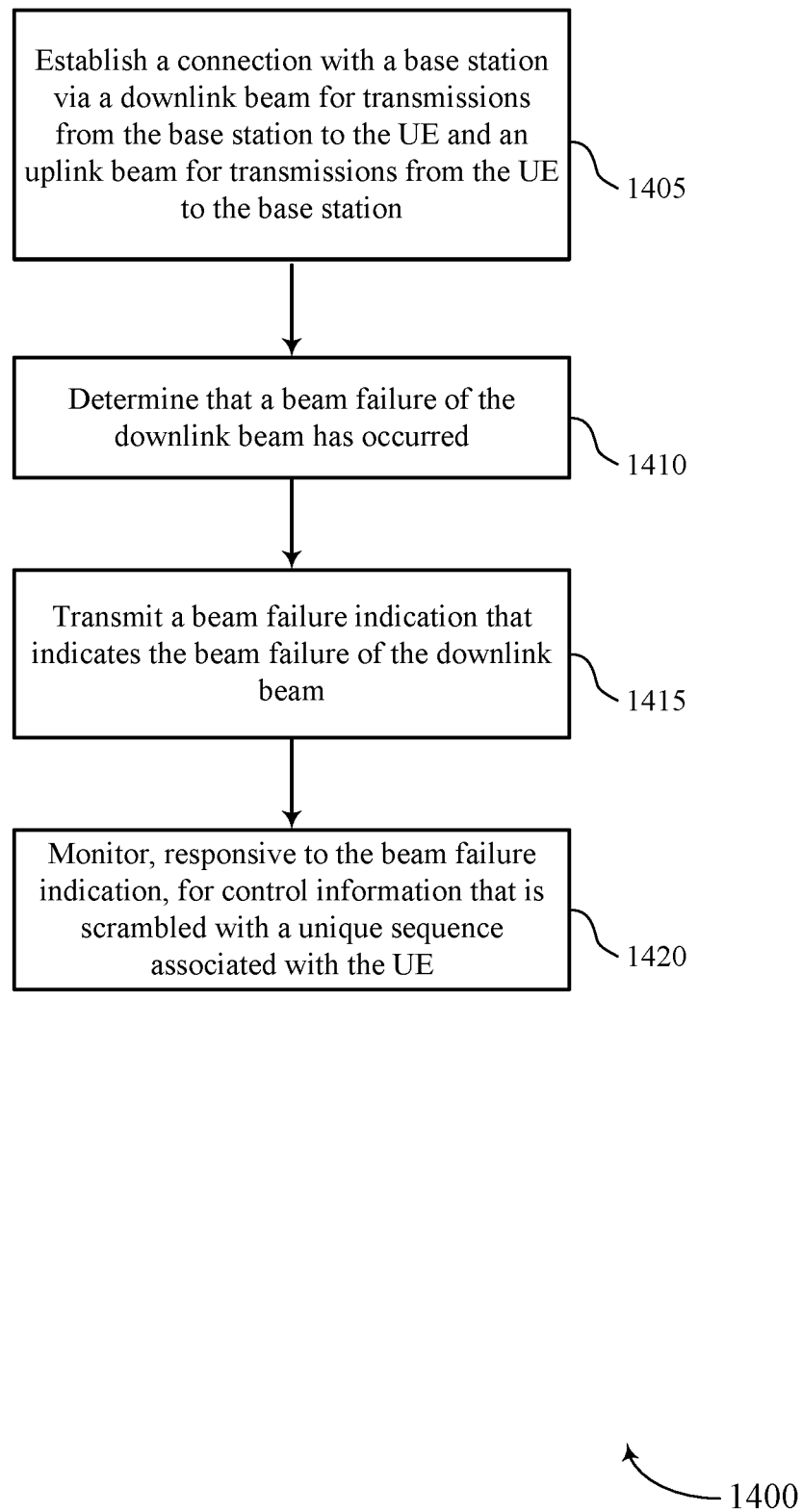
FIGS. 14 through 21 show flowcharts illustrating methods that support beam recovery techniques in beamformed wireless communications in accordance with aspects of the present disclosure.

FIG. 14 shows a flowchart illustrating a method 1400 that supports beam recovery techniques in beamformed wireless communications in accordance with aspects of the present disclosure. The operations of method 1400 may be implemented by a UE 115 or its components as described herein. For example, the operations of method 1400 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1405, the UE may establish a connection with a base station via a downlink beam for transmissions from the base station to the UE and an uplink beam for transmissions from the UE to the base station. In some cases, the downlink beam and the uplink beam are decoupled beams that use different beamforming parameters. The operations of 1405 may be performed according to the methods described herein. In some examples, aspects of the operations of 1405 may be performed by a connection establishment manager as described with reference to FIGS. 6 through 9.

At 1410, the UE may determine that a beam failure of the downlink beam has occurred. The operations of 1410 may be performed according to the methods described herein. In some examples, aspects of the operations of 1410 may be performed by a beam measurement component as described with reference to FIGS. 6 through 9.

At 1415, the UE may transmit a beam failure indication (e.g., a SR) to the base station that indicates the beam failure of the downlink beam. The operations of 1415 may be performed according to the methods described herein. In some examples, aspects of the operations of 1415 may be performed by a beam manager as described with reference to FIGS. 6 through 9.

At 1420, the UE may monitor, responsive to the beam failure indication, for control information that is scrambled with a unique sequence (e.g., a RNTI) associated with the UE. The operations of 1420 may be performed according to the methods described herein. In some examples, aspects of the operations of 1420 may be performed by a beam manager as described with reference to FIGS. 6 through 9.

Figure 15:
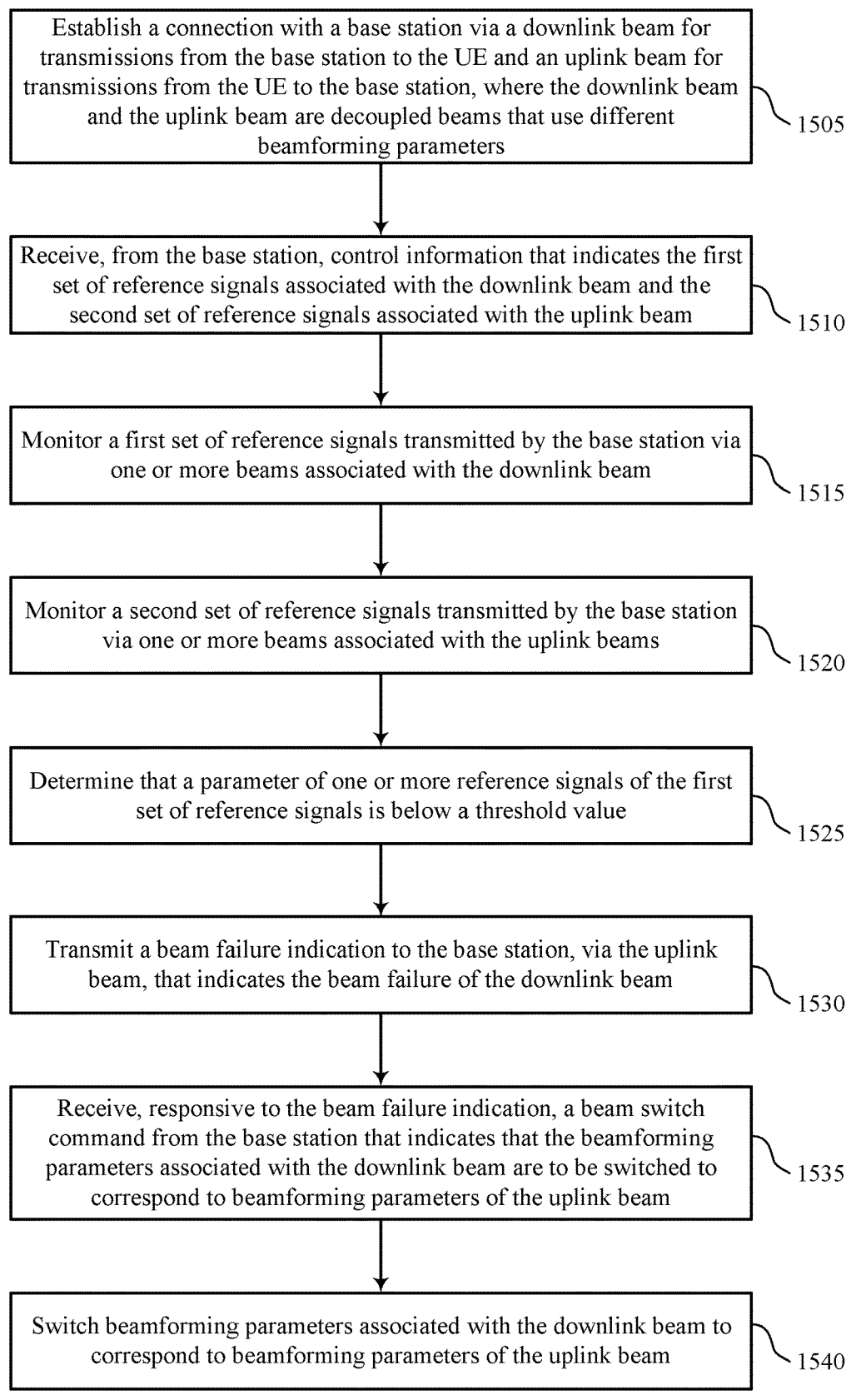

FIG. 15 shows a flowchart illustrating a method 1500 that supports beam recovery techniques in beamformed wireless communications in accordance with aspects of the present disclosure. The operations of method 1500 may be implemented by a UE 115 or its components as described herein. For example, the operations of method 1500 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1505, the UE may establish a connection with a base station via a downlink beam for transmissions from the base station to the UE and an uplink beam for transmissions from the UE to the base station, where the downlink beam and the uplink beam are decoupled beams that use different beamforming parameters. The operations of 1505 may be performed according to the methods described herein. In some examples, aspects of the operations of 1505 may be performed by a connection establishment manager as described with reference to FIGS. 6 through 9.

At 1510, the UE may receive, from the base station, control information that indicates the first set of reference signals associated with the downlink beam and the second set of reference signals associated with the uplink beam. The operations of 1510 may be performed according to the methods described herein. In some examples, aspects of the operations of 1510 may be performed by a beam measurement component as described with reference to FIGS. 6 through 9.

At 1515, the UE may monitor a first set of reference signals transmitted by the base station via one or more beams associated with the downlink beam. The operations of 1515 may be performed according to the methods described herein. In some examples, aspects of the operations of 1515 may be performed by a beam measurement component as described with reference to FIGS. 6 through 9.

At 1520, the UE may monitor a second set of reference signals transmitted by the base station via one or more beams associated with the uplink beams. The operations of 1520 may be performed according to the methods described herein. In some examples, aspects of the operations of 1520 may be performed by a beam measurement component as described with reference to FIGS. 6 through 9.

At 1525, the UE may determine that a parameter of one or more reference signals of the first set of reference signals is below a threshold value. The operations of 1525 may be performed according to the methods described herein. In some examples, aspects of the operations of 1525 may be performed by a beam measurement component as described with reference to FIGS. 6 through 9.

At 1530, the UE may transmit a beam failure indication to the base station, via the uplink beam, that indicates the beam failure of the downlink beam. The operations of 1530 may be performed according to the methods described herein. In some examples, aspects of the operations of 1530 may be performed by a beam manager as described with reference to FIGS. 6 through 9.

At 1535, the UE may receive, responsive to the beam failure indication, a beam switch command from the base station that indicates that the beamforming parameters associated with the downlink beam are to be switched to correspond to beamforming parameters of the uplink beam. The operations of 1535 may be performed according to the methods described herein. In some examples, aspects of the operations of 1535 may be performed by a beam manager as described with reference to FIGS. 6 through 9.

At 1540, the UE may switch beamforming parameters associated with the downlink beam to correspond to beamforming parameters of the uplink beam. The operations of 1540 may be performed according to the methods described herein. In some examples, aspects of the operations of 1540 may be performed by a beam manager as described with reference to FIGS. 6 through 9.

Figure 16:
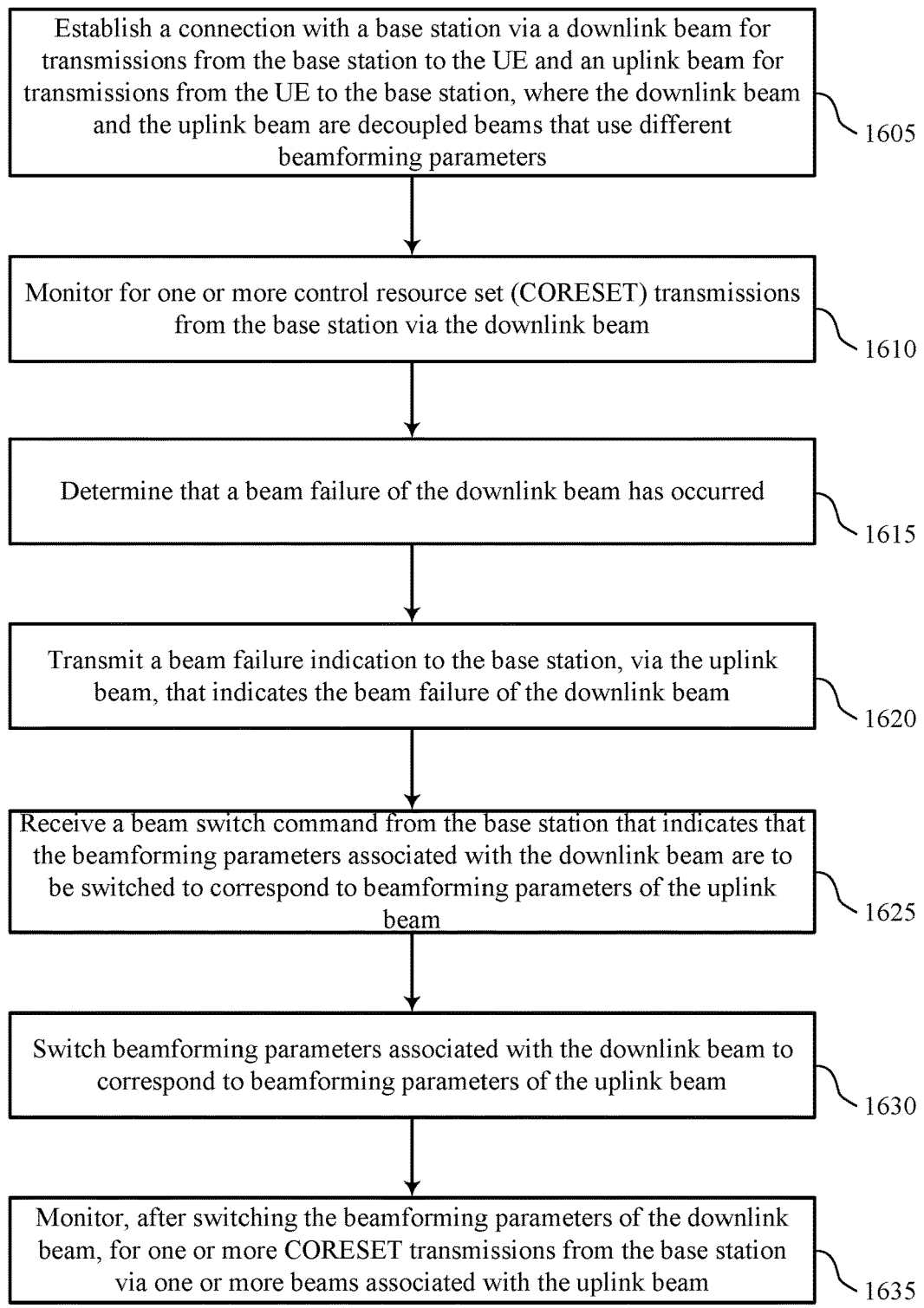

FIG. 16 shows a flowchart illustrating a method 1600 that supports beam recovery techniques in beamformed wireless communications in accordance with aspects of the present disclosure. The operations of method 1600 may be implemented by a UE 115 or its components as described herein. For example, the operations of method 1600 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1605, the UE may establish a connection with a base station via a downlink beam for transmissions from the base station to the UE and an uplink beam for transmissions from the UE to the base station, where the downlink beam and the uplink beam are decoupled beams that use different beamforming parameters. The operations of 1605 may be performed according to the methods described herein. In some examples, aspects of the operations of 1605 may be performed by a connection establishment manager as described with reference to FIGS. 6 through 9.

At 1610, the UE may monitor for one or more control resource set (CORESET) transmissions from the base station via the downlink beam. The operations of 1610 may be performed according to the methods described herein. In some examples, aspects of the operations of 1610 may be performed by a beam manager as described with reference to FIGS. 6 through 9.

At 1615, the UE may determine that a beam failure of the downlink beam has occurred. The operations of 1615 may be performed according to the methods described herein. In some examples, aspects of the operations of 1615 may be performed by a beam measurement component as described with reference to FIGS. 6 through 9.

At 1620, the UE may transmit a beam failure indication to the base station, via the uplink beam, that indicates the beam failure of the downlink beam. The operations of 1620 may be performed according to the methods described herein. In some examples, aspects of the operations of 1620 may be performed by a beam manager as described with reference to FIGS. 6 through 9.

At 1625, the UE may receive a beam switch command from the base station that indicates that the beamforming parameters associated with the downlink beam are to be switched to correspond to beamforming parameters of the uplink beam. The operations of 1625 may be performed according to the methods described herein. In some examples, aspects of the operations of 1625 may be performed by a beam manager as described with reference to FIGS. 6 through 9.

At 1630, the UE may switch beamforming parameters associated with the downlink beam to correspond to beamforming parameters of the uplink beam. The operations of 1630 may be performed according to the methods described herein. In some examples, aspects of the operations of 1630 may be performed by a beam manager as described with reference to FIGS. 6 through 9.

At 1635, the UE may monitor, after switching the beamforming parameters of the downlink beam, for one or more CORESET transmissions from the base station via one or more beams associated with the uplink beam. The operations of 1635 may be performed according to the methods described herein. In some examples, aspects of the operations of 1635 may be performed by a beam manager as described with reference to FIGS. 6 through 9.

Figure 17:
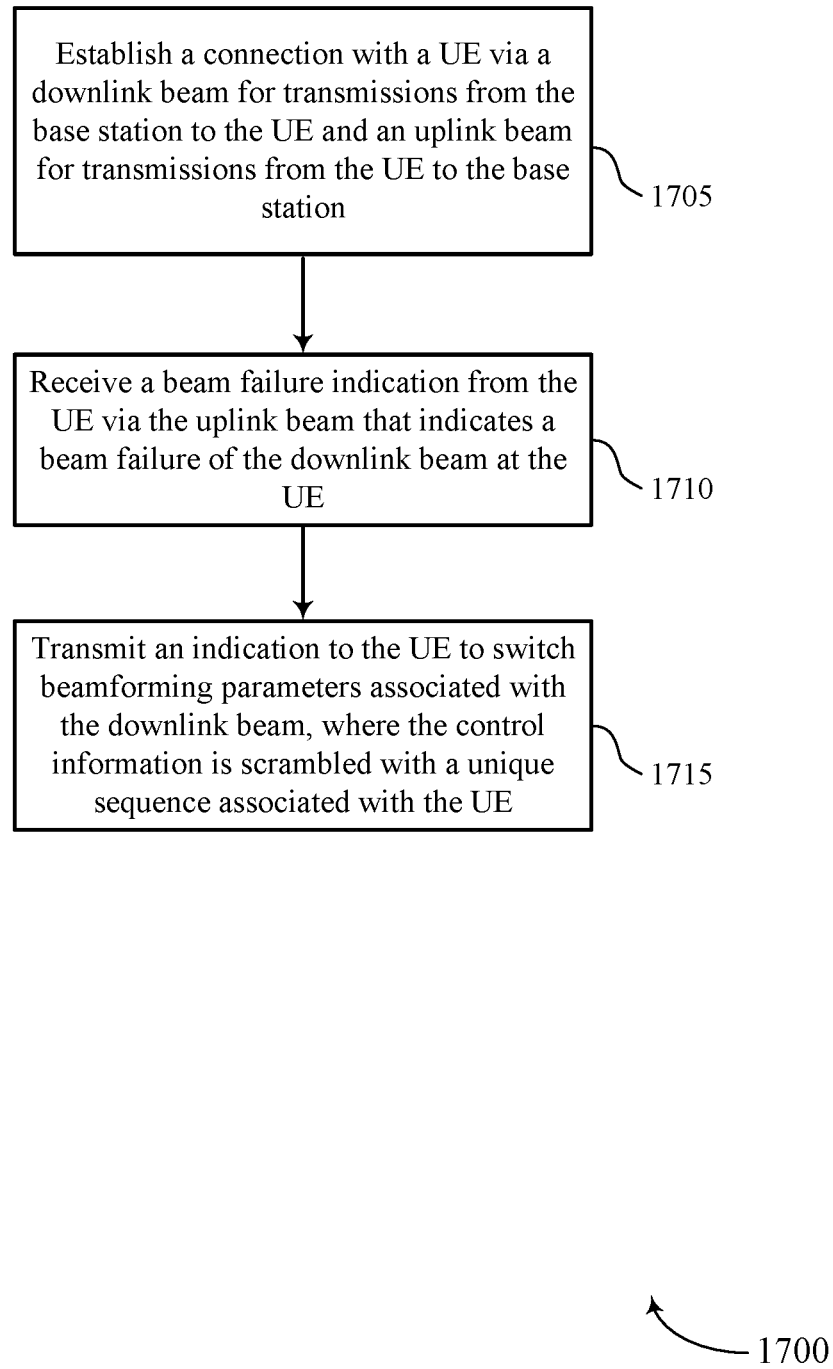

FIG. 17 shows a flowchart illustrating a method 1700 that supports beam recovery techniques in beamformed wireless communications in accordance with aspects of the present disclosure. The operations of method 1700 may be implemented by a base station 105 or its components as described herein. For example, the operations of method 1700 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1705, the base station may establish a connection with a UE via a downlink beam for transmissions from the base station to the UE and an uplink beam for transmissions from the UE to the base station. The operations of 1705 may be performed according to the methods described herein. In some examples, aspects of the operations of 1705 may be performed by a connection establishment manager as described with reference to FIGS. 10 through 13.

At 1710, the base station may receive a beam failure indication from the UE that indicates a beam failure of the downlink beam at the UE. The operations of 1710 may be performed according to the methods described herein. In some examples, aspects of the operations of 1710 may be performed by a beam manager as described with reference to FIGS. 10 through 13.

At 1715, the base station may transmit control information to the UE to switch beamforming parameters associated with the downlink beam, where the control information is scrambled with a unique sequence associated with the UE. The operations of 1715 may be performed according to the methods described herein. In some examples, aspects of the operations of 1715 may be performed by a beam manager as described with reference to FIGS. 10 through 13.

Figure 18:
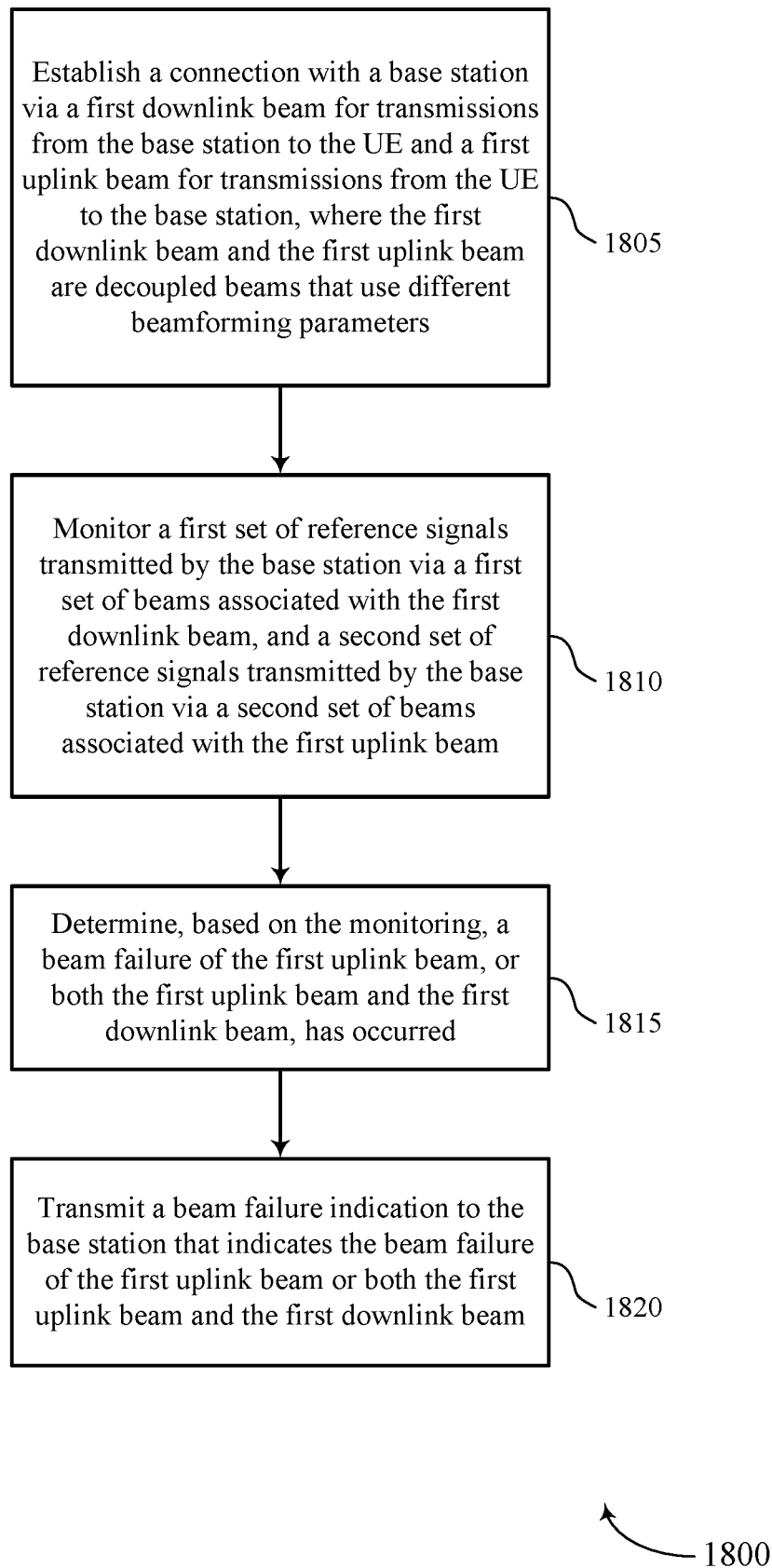

FIG. 18 shows a flowchart illustrating a method 1800 that supports beam recovery techniques in beamformed wireless communications in accordance with aspects of the present disclosure. The operations of method 1800 may be implemented by a UE 115 or its components as described herein. For example, the operations of method 1800 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1805, the UE may establish a connection with a base station via a first downlink beam for transmissions from the base station to the UE and a first uplink beam for transmissions from the UE to the base station, where the first downlink beam and the first uplink beam are decoupled beams that use different beamforming parameters. The operations of 1805 may be performed according to the methods described herein. In some examples, aspects of the operations of 1805 may be performed by a connection establishment manager as described with reference to FIGS. 6 through 9.

At 1810, the UE may monitor a first set of reference signals transmitted by the base station via a first set of beams associated with the first downlink beam, and a second set of reference signals transmitted by the base station via a second set of beams associated with the first uplink beam. The operations of 1810 may be performed according to the methods described herein. In some examples, aspects of the operations of 1810 may be performed by a beam measurement component as described with reference to FIGS. 6 through 9.

At 1815, the UE may determine, based on the monitoring, a beam failure of the first uplink beam, or both the first uplink beam and the first downlink beam, has occurred. The operations of 1815 may be performed according to the methods described herein. In some examples, aspects of the operations of 1815 may be performed by a beam manager as described with reference to FIGS. 6 through 9.

At 1820, the UE may transmit a beam failure indication (e.g., on a candidate beam as discussed with respect to FIGS. 3 and 5) to the base station that indicates the beam failure of the first uplink beam or both the first uplink beam and the first downlink beam. The operations of 1820 may be performed according to the methods described herein. In some examples, aspects of the operations of 1820 may be performed by a beam manager as described with reference to FIGS. 6 through 9.

Figure 19:
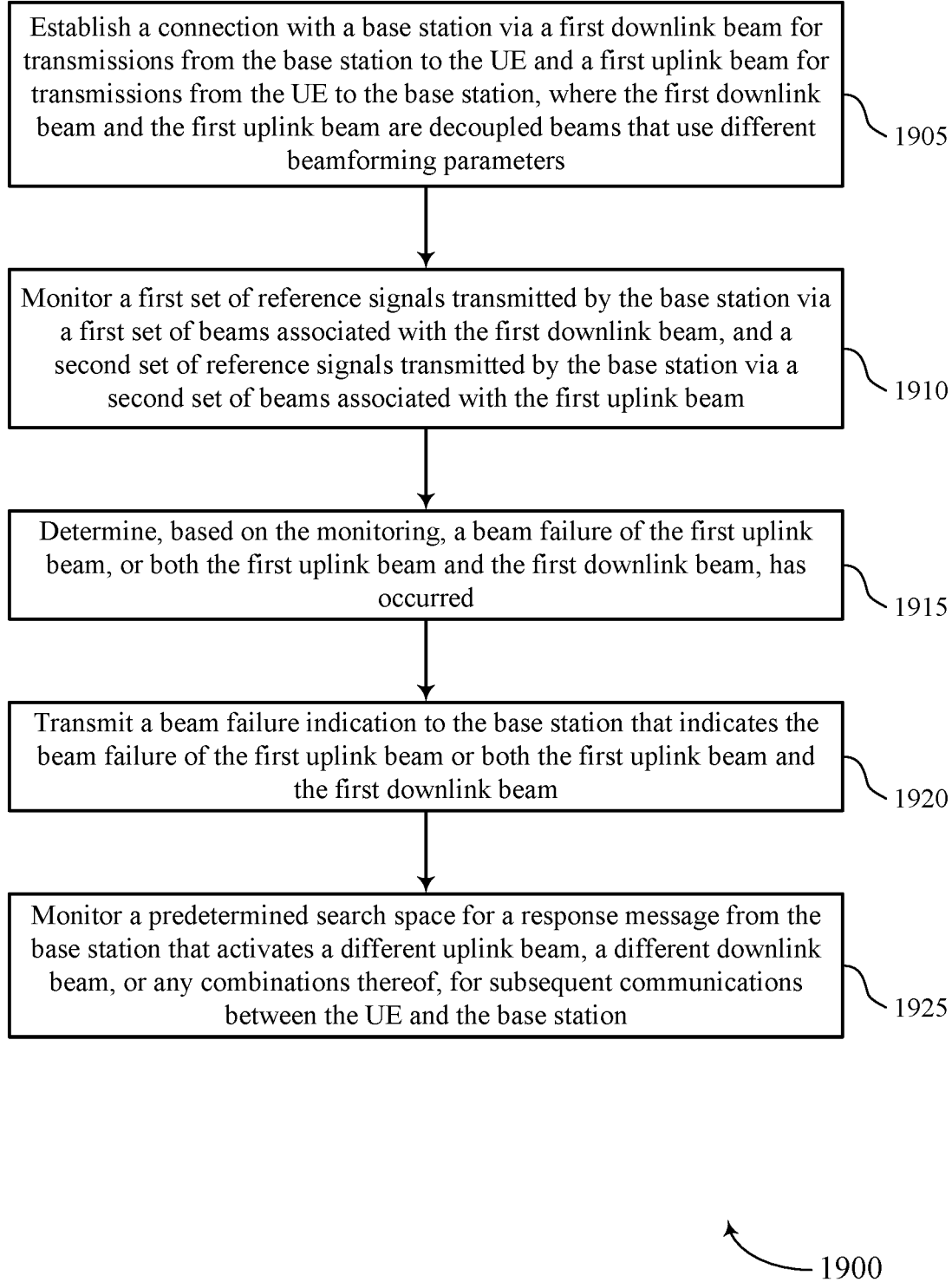

FIG. 19 shows a flowchart illustrating a method 1900 that supports beam recovery techniques in beamformed wireless communications in accordance with aspects of the present disclosure. The operations of method 1900 may be implemented by a UE 115 or its components as described herein. For example, the operations of method 1900 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1905, the UE may establish a connection with a base station via a first downlink beam for transmissions from the base station to the UE and a first uplink beam for transmissions from the UE to the base station, where the first downlink beam and the first uplink beam are decoupled beams that use different beamforming parameters. The operations of 1905 may be performed according to the methods described herein. In some examples, aspects of the operations of 1905 may be performed by a connection establishment manager as described with reference to FIGS. 6 through 9.

At 1910, the UE may monitor a first set of reference signals transmitted by the base station via a first set of beams associated with the first downlink beam, and a second set of reference signals transmitted by the base station via a second set of beams associated with the first uplink beam. The operations of 1910 may be performed according to the methods described herein. In some examples, aspects of the operations of 1910 may be performed by a beam measurement component as described with reference to FIGS. 6 through 9.

At 1915, the UE may determine, based on the monitoring, a beam failure of the first uplink beam, or both the first uplink beam and the first downlink beam, has occurred. The operations of 1915 may be performed according to the methods described herein. In some examples, aspects of the operations of 1915 may be performed by a beam manager as described with reference to FIGS. 6 through 9.

At 1920, the UE may transmit a beam failure indication to the base station that indicates the beam failure of the first uplink beam or both the first uplink beam and the first downlink beam. Such a beam failure indication may be provided, for example, in a RACH transmission on a candidate beam (e.g., on a candidate beam as discussed with respect to FIGS. 3 and 5). The operations of 1920 may be performed according to the methods described herein. In some examples, aspects of the operations of 1920 may be performed by a beam manager as described with reference to FIGS. 6 through 9.

At 1925, the UE may monitor a predetermined search space for a response message from the base station that activates a different uplink beam, a different downlink beam, or any combinations thereof, for subsequent communications between the UE and the base station. The operations of 1925 may be performed according to the methods described herein. In some examples, aspects of the operations of 1925 may be performed by a beam measurement component as described with reference to FIGS. 6 through 9.

Figure 20:
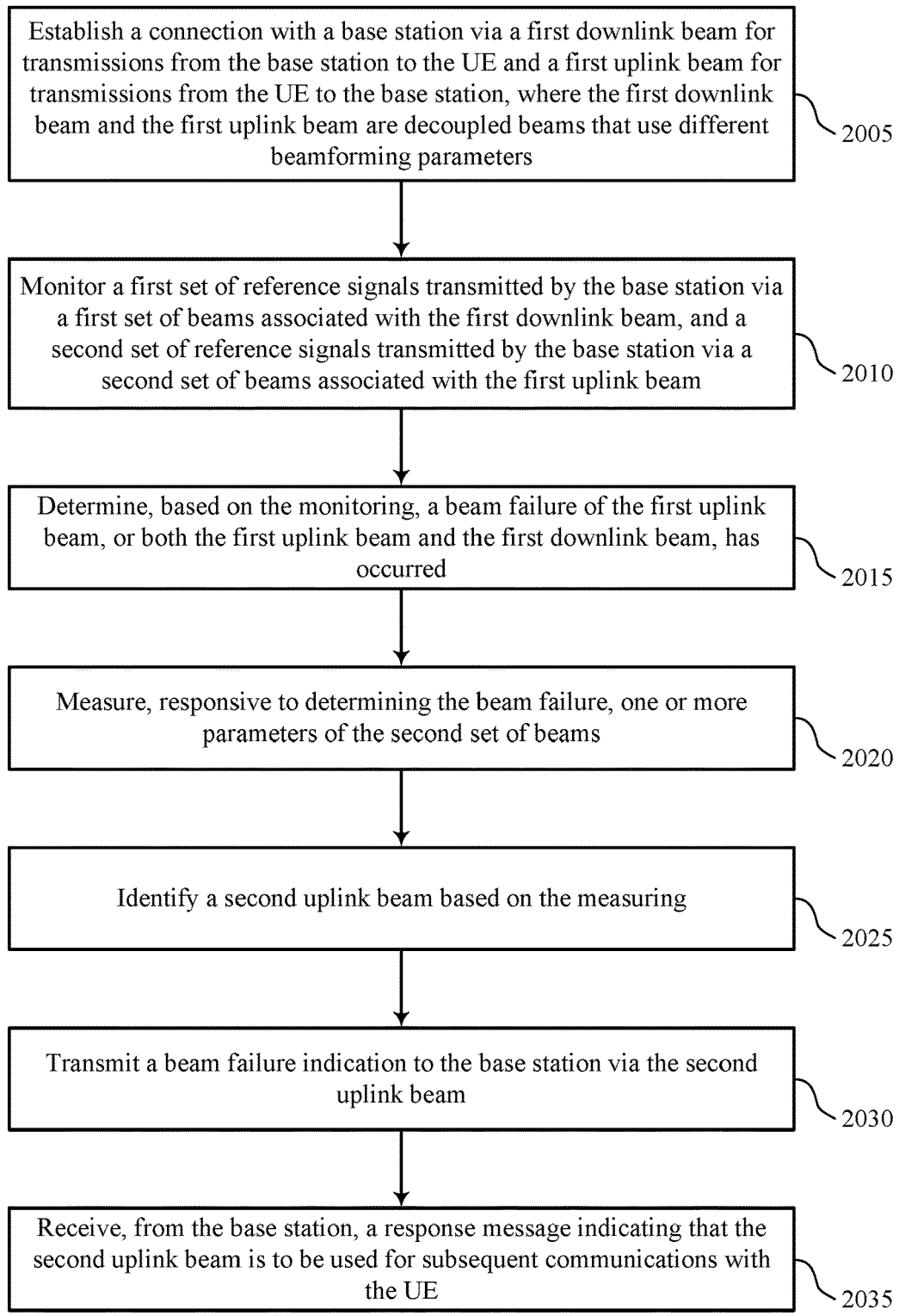

FIG. 20 shows a flowchart illustrating a method 2000 that supports beam recovery techniques in beamformed wireless communications in accordance with aspects of the present disclosure. The operations of method 2000 may be implemented by a UE 115 or its components as described herein. For example, the operations of method 2000 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 2005, the UE may establish a connection with a base station via a first downlink beam for transmissions from the base station to the UE and a first uplink beam for transmissions from the UE to the base station, where the first downlink beam and the first uplink beam are decoupled beams that use different beamforming parameters. The operations of 2005 may be performed according to the methods described herein. In some examples, aspects of the operations of 2005 may be performed by a connection establishment manager as described with reference to FIGS. 6 through 9.

At 2010, the UE may monitor a first set of reference signals transmitted by the base station via a first set of beams associated with the first downlink beam, and a second set of reference signals transmitted by the base station via a second set of beams associated with the first uplink beam. The operations of 2010 may be performed according to the methods described herein. In some examples, aspects of the operations of 2010 may be performed by a beam measurement component as described with reference to FIGS. 6 through 9.

At 2015, the UE may determine, based on the monitoring, a beam failure of the first uplink beam, or both the first uplink beam and the first downlink beam, has occurred. The operations of 2015 may be performed according to the methods described herein. In some examples, aspects of the operations of 2015 may be performed by a beam manager as described with reference to FIGS. 6 through 9.

At 2020, the UE may measure, responsive to determining the beam failure, one or more parameters of the second set of beams. The operations of 2020 may be performed according to the methods described herein. In some examples, aspects of the operations of 2020 may be performed by a beam measurement component as described with reference to FIGS. 6 through 9.

At 2025, the UE may identify a second uplink beam based on the measuring, and where the beam failure indication is transmitted via the second uplink beam. The operations of 2025 may be performed according to the methods described herein. In some examples, aspects of the operations of 2025 may be performed by a beam measurement component as described with reference to FIGS. 6 through 9.

At 2030, the UE may transmit a beam failure indication to the base station that indicates the beam failure of the first uplink beam or both the first uplink beam and the first downlink beam. The operations of 2030 may be performed according to the methods described herein. In some examples, aspects of the operations of 2030 may be performed by a beam manager as described with reference to FIGS. 6 through 9.

At 2035, the UE may receive, from the base station, a response message indicating that the second uplink beam is to be used for subsequent communications with the UE. The operations of 2035 may be performed according to the methods described herein. In some examples, aspects of the operations of 2035 may be performed by a beam manager as described with reference to FIGS. 6 through 9.

Figure 21:
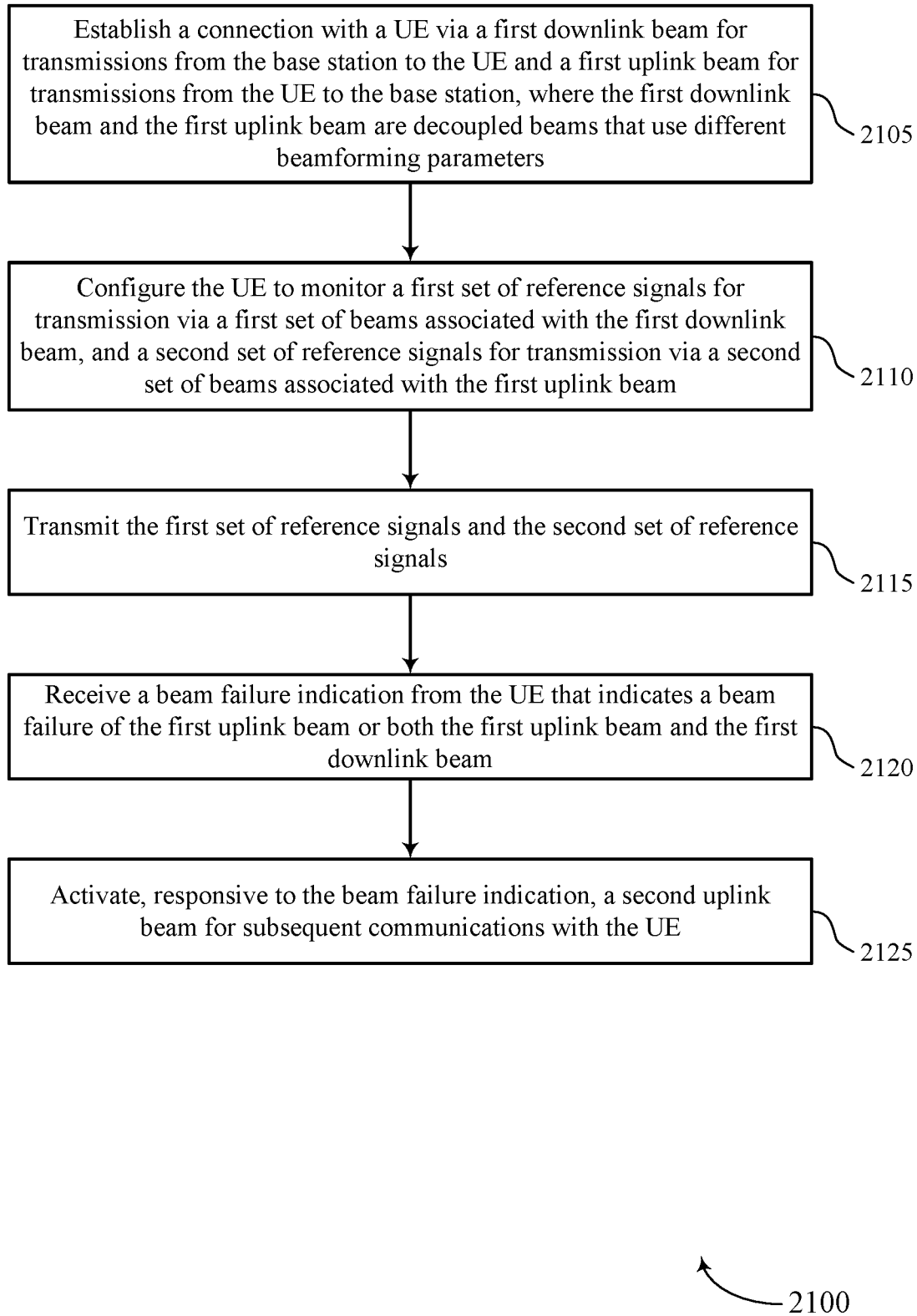

FIG. 21 shows a flowchart illustrating a method 2100 that supports beam recovery techniques in beamformed wireless communications in accordance with aspects of the present disclosure. The operations of method 2100 may be implemented by a base station 105 or its components as described herein. For example, the operations of method 2100 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 2105, the base station may establish a connection with a UE via a first downlink beam for transmissions from the base station to the UE and a first uplink beam for transmissions from the UE to the base station, where the first downlink beam and the first uplink beam are decoupled beams that use different beamforming parameters. The operations of 2105 may be performed according to the methods described herein. In some examples, aspects of the operations of 2105 may be performed by a connection establishment manager as described with reference to FIGS. 10 through 13.

At 2110, the base station may configure the UE to monitor a first set of reference signals for transmission via a first set of beams associated with the first downlink beam, and a second set of reference signals for transmission via a second set of beams associated with the first uplink beam. The operations of 2110 may be performed according to the methods described herein. In some examples, aspects of the operations of 2110 may be performed by a reference signal manager as described with reference to FIGS. 10 through 13.

At 2115, the base station may transmit the first set of reference signals and the second set of reference signals. The operations of 2115 may be performed according to the methods described herein. In some examples, aspects of the operations of 2115 may be performed by a reference signal manager as described with reference to FIGS. 10 through 13.

At 2120, the base station may receive a beam failure indication from the UE that indicates a beam failure of the first uplink beam or both the first uplink beam and the first downlink beam. The operations of 2120 may be performed according to the methods described herein. In some examples, aspects of the operations of 2120 may be performed by a beam manager as described with reference to FIGS. 10 through 13.

At 2125, the base station may activate, responsive to the beam failure indication, a second uplink beam for subsequent communications with the UE. The operations of 2125 may be performed according to the methods described herein. In some examples, aspects of the operations of 2125 may be performed by a beam manager as described with reference to FIGS. 10 through 13.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
    establishing, at a user equipment (UE), a connection with a cell at an access network entity via a downlink beam of the cell for transmissions from the access network entity to the UE and an uplink beam of the cell for transmissions from the UE to the access network entity, wherein the downlink beam and the uplink beam each carry control channel and data channel communications between the UE and the access network entity;
    determining, at the UE subsequent to one or more data channel or control channel communications via the uplink beam, that a beam failure of the downlink beam has occurred and that a beam failure is not present on the uplink beam, and wherein the uplink beam is decoupled with the downlink beam based at least in part on the uplink beam and the downlink beam using different beamforming parameters;
    transmitting a beam failure indication, via the uplink beam, that indicates the beam failure of the downlink beam; and
    monitoring, responsive to the beam failure indication, for control information that is scrambled with a unique sequence associated with the UE, wherein the control information comprises a beam switch command that indicates that beamforming parameters associated with the downlink beam are to be switched from being decoupled to correspond to beamforming parameters of the uplink beam.

2. The method of claim 1, wherein:
    the unique sequence is a radio network temporary identifier (RNTI) associated with the UE.

3. The method of claim 1, wherein the transmitting comprises:
    transmitting a scheduling request (SR), via the uplink beam, that includes one or more bits that indicate the beam failure of the downlink beam.

4. The method of claim 1, wherein the transmitting comprises:
    transmitting the beam failure indication in a physical uplink control channel (PUCCH) transmission via the uplink beam.

5. The method of claim 1, wherein the determining the beam failure of the downlink beam comprises:
    receiving second control information that indicates a first set of reference signals associated with the downlink beam and a second set of reference signals associated with the uplink beam;
    monitoring the first set of reference signals transmitted via one or more beams associated with the downlink beam;
    monitoring the second set of reference signals transmitted via one or more beams associated with the uplink beam; and
    determining that a parameter of one or more reference signals of the first set of reference signals is below a threshold value.

6. The method of claim 1, wherein the control information is monitored by the UE for a predetermined time after sending the beam failure indication.

7. The method of claim 1, further comprising:
    retransmitting the beam failure indication to the access network entity responsive to determining that a predetermined time period has elapsed without receiving the control information.

8. The method of claim 1, wherein the beam failure indication is transmitted in a scheduling request (SR) beam sweeping operation of the access network entity, and wherein the monitoring is performed using time division multiplexing according to the SR beam sweeping operation.

9. The method of claim 1, further comprising:
    monitoring for one or more control resource set (CORESET) transmissions from the access network entity;
    receiving the beam switch command from the access network entity that indicates that the beamforming parameters associated with the downlink beam are to be switched to correspond to the beamforming parameters of the uplink beam; and
    monitoring, after switching the beamforming parameters of the downlink beam, for one or more CORESET transmissions from the access network entity via one or more beams associated with the uplink beam.

10. A method for wireless communication, comprising:
    establishing, at an access network entity, a connection with a user equipment (UE) via a downlink beam of a cell for transmissions from the access network entity to the UE and an uplink beam of the cell for transmissions from the UE to the access network entity, wherein the downlink beam and the uplink beam each carry control channel and data channel communications between the UE and the access network entity;
    receiving, from the UE subsequent to one or more data channel or control channel communications via the uplink beam, a beam failure indication from the UE via the uplink beam that indicates a beam failure of the downlink beam and that a beam failure is not present on the uplink beam at the UE, and wherein the uplink beam is decoupled with the downlink beam based at least in part on the uplink beam and the downlink beam using different beamforming parameters; and
    transmitting, to the UE, control information that is scrambled with a unique sequence associated with the UE, wherein the control information comprises a beam switch command that indicates that beamforming parameters associated with the downlink beam are to be switched from being decoupled to correspond to beamforming parameters of the uplink beam.

11. The method of claim 10, wherein:
    the unique sequence is a radio network temporary identifier (RNTI) associated with the UE.

12. The method of claim 10, wherein the receiving comprises:
  receiving a scheduling request (SR) from the UE, via the uplink beam, that includes one or more bits that indicate the beam failure of the downlink beam.

13. The method of claim 10, wherein the receiving comprises:
  receiving the beam failure indication in a physical uplink control channel (PUCCH) transmission from the UE via the uplink beam.

14. The method of claim 10, further comprising:
  transmitting a first set of reference signals via a first set of beams associated with the downlink beam; and
  transmitting a second set of reference signals via a second set of beams associated with the uplink beam, and wherein the beam failure indication indicates a parameter of one or more reference signals of the first set of reference signals as measured at the UE is below a threshold value.

15. The method of claim 14, further comprising:
  configuring the UE with the first set of reference signals to be monitored in the first set of beams and the second set of reference signals to be monitored in the second set of beams.

16. The method of claim 10, wherein the beam failure indication is received in a scheduling request (SR) beam sweeping operation, and wherein the beam switch command is transmitted according to the SR beam sweeping operation.

17. A method for wireless communication, comprising:
  establishing, at a user equipment (UE), a connection with an access network entity via a first downlink beam for transmissions from the access network entity to the UE and a first uplink beam for transmissions from the UE to the access network entity, wherein the first downlink beam and the first uplink beam are decoupled beams that use different beamforming parameters, and wherein the first downlink beam and the first uplink beam each carry control channel and data channel communications between the UE and the access network entity;
  monitoring a first set of reference signals transmitted by the access network entity via a first set of beams associated with the first downlink beam, and a second set of reference signals transmitted by the access network entity via at least a second beam that is different than any beam of the first set of beams, and wherein beamforming parameters of the second beam correspond to beamforming parameters of the first uplink beam;
  determining, subsequent to one or more data channel or control channel communications via the first uplink beam, a beam failure of the first uplink beam, or both the first uplink beam and the first downlink beam, has occurred, wherein the beam failure of the first uplink beam or both the first uplink beam and the first downlink beam is determined at the UE based at least in part on the monitoring of the second set of reference signals; and
  transmitting a beam failure indication to the access network entity that indicates the beam failure of the first uplink beam or both the first uplink beam and the first downlink beam.

18. The method of claim 17, further comprising:
  monitoring a predetermined search space for a response message from the access network entity that activates a different uplink beam, a different downlink beam, or any combinations thereof, for subsequent communications between the UE and the access network entity.

19. The method of claim 17, wherein the beam failure of the first uplink beam is a function of one or more uplink parameters associated with the first uplink beam, the one or more uplink parameters including one or more of an uplink transmission power, a modulation and coding scheme (MCS), a modulation order, a coding rate, or any combinations thereof.

20. The method of claim 17, further comprising:
  measuring, responsive to determining the beam failure, one or more parameters of the second set of reference signals; and
  identifying a second uplink beam based at least in part on the measuring, and wherein the beam failure indication is transmitted via the second uplink beam.

21. The method of claim 20, further comprising:
  receiving a response message indicating that the second uplink beam is to be used for subsequent communications with the UE.

22. The method of claim 21, wherein the response message is transmitted via a downlink control channel transmission having one or more of a control information format associated with a changed uplink transmission beam, an applied scrambling sequence associated with a changed uplink transmission beam, a special medium access control (MAC) control element (MAC-CE) associated with a changed uplink transmission beam, or any combinations thereof.

23. A method for wireless communication, comprising:
  establishing, at an access network entity, a connection with a user equipment (UE) via a first downlink beam for transmissions from the access network entity to the UE and a first uplink beam for transmissions from the UE to the access network entity, wherein the first downlink beam and the first uplink beam are decoupled beams that use different beamforming parameters, and wherein the first downlink beam and the first uplink beam each carry control channel and data channel communications between the UE and the access network entity;
  configuring the UE to monitor a first set of reference signals for transmission via a first set of beams associated with the first downlink beam, and a second set of reference signals for transmission via at least a second beam that is different than any beam of the first set of beams, and wherein beamforming parameters of the second beam correspond to beamforming parameters of the first uplink beam;
  transmitting the first set of reference signals and the second set of reference signals;
  receiving, subsequent to one or more data channel or control channel communications via the first uplink beam, a beam failure indication from the UE that indicates a beam failure of the first uplink beam or both the first uplink beam and the first downlink beam, wherein the beam failure of the first uplink beam or both the first uplink beam and the first downlink beam is determined at the UE based at least in part on the second set of reference signals; and
  activating, responsive to the beam failure indication, a second uplink beam for subsequent communications with the UE.

24. The method of claim 23, wherein the activating comprises:
  transmitting, using downlink resources within a predetermined search space, a response message to the UE that activates the second uplink beam, a second downlink beam, or any combinations thereof, for subsequent communications between the UE and the access network entity.

25. The method of claim 23, wherein the beam failure indication is received via the second uplink beam, and wherein the second uplink beam is associated with the second set of reference signals.

26. The method of claim 23, wherein the activating comprises transmitting a response message via a downlink control channel transmission having one or more of a control information format associated with a changed uplink transmission beam, an applied scrambling sequence associated with a changed uplink transmission beam, a special medium access control (MAC) control element (MAC-CE) associated with a changed uplink transmission beam, or any combinations thereof.

27. The method of claim 26, further comprising:
receiving, responsive to transmitting the response message, an acknowledgment from the UE that indicates the UE successfully received the response message, wherein the acknowledgment is transmitted via the second uplink beam.

28. An apparatus for wireless communication, comprising: a processor, memory in electronic communication with the processor; and instructions stored in the memory and executable by the processor to cause the apparatus to:
establish, at a user equipment (UE), a connection with a cell at an access network entity via a downlink beam of the cell for transmissions from the access network entity to the UE and an uplink beam of the cell for transmissions from the UE to the access network entity, wherein the downlink beam and the uplink beam each carry control channel and data channel communications between the UE and the access network entity;
determine, at the UE subsequent to one or more data channel or control channel communications via the uplink beam, that a beam failure of the downlink beam has occurred and that a beam failure is not present on the uplink beam, and wherein the uplink beam is decoupled with the downlink beam based at least in part on the uplink beam and the downlink beam using different beamforming parameters;
transmit a beam failure indication, via the uplink beam, that indicates the beam failure of the downlink beam; and
monitor, responsive to the beam failure indication, for control information that is scrambled with a unique sequence associated with the UE, wherein the control information comprises a beam switch command that indicates that beamforming parameters associated with the downlink beam are to be switched from being decoupled to correspond to beamforming parameters of the uplink beam.

29. The apparatus of claim 28, wherein:
the unique sequence is a radio network temporary identifier (RNTI) associated with the UE.

30. The apparatus of claim 28, wherein the instructions are further executable by the processor to cause the apparatus to:
transmit a scheduling request (SR), via the uplink beam, that includes one or more bits that indicate the beam failure of the downlink beam, or
transmit the beam failure indication in a physical uplink control channel (PUCCH) transmission via the uplink beam.

31. The apparatus of claim 28, wherein the instructions are further executable by the processor to cause the apparatus to:
receive second control information that indicates a first set of reference signals associated with the downlink beam and a second set of reference signals associated with the uplink beam;
monitor the first set of reference signals transmitted via one or more beams associated with the downlink beam;
monitor the second set of reference signals transmitted via one or more beams associated with the uplink beam; and
determine that a parameter of one or more reference signals of the first set of reference signals is below a threshold value.

32. The apparatus of claim 28, wherein the control information is monitored by the UE for a predetermined time after sending the beam failure indication, and includes the beam switch command that indicates that the beamforming parameters associated with the downlink beam are to be switched to correspond to the beamforming parameters of the uplink beam.

33. The apparatus of claim 28, wherein the instructions are further executable by the processor to cause the apparatus to:
monitor for one or more control resource set (CORESET) transmissions from the access network entity;
receive the beam switch command from the access network entity that indicates that the beamforming parameters associated with the downlink beam are to be switched to correspond to the beamforming parameters of the uplink beam; and
monitor, after switching the beamforming parameters of the downlink beam, for one or more CORESET transmissions from the access network entity via one or more beams associated with the uplink beam.

34. An apparatus for wireless communication, comprising: a processor, memory in electronic communication with the processor; and instructions stored in the memory and executable by the processor to cause the apparatus to:
establish, at an access network entity, a connection with a user equipment (UE) via a downlink beam of a cell for transmissions from the access network entity to the UE and an uplink beam of the cell for transmissions from the UE to the access network entity, wherein the downlink beam and the uplink beam each carry control channel and data channel communications between the UE and the access network entity;
receive, from the UE subsequent to one or more data channel or control channel communications via the uplink beam, a beam failure indication from the UE via the uplink beam that indicates a beam failure of the downlink beam and that a beam failure is not present on the uplink beam at the UE, and wherein the uplink beam is decoupled with the downlink beam based at least in part on the uplink beam and the downlink beam using different beamforming parameters; and
transmit, to the UE, control information that is scrambled with a unique sequence associated with the UE, wherein the control information comprises a beam switch command that indicates that beamforming parameters associated with the downlink beam are to be switched from being decoupled to correspond to beamforming parameters of the uplink beam.

35. The apparatus of claim 34, wherein:
the unique sequence is a radio network temporary identifier (RNTI) associated with the UE.

36. The apparatus of claim 34, wherein the instructions are further executable by the processor to cause the apparatus to:
- receive a scheduling request (SR) from the UE, via the uplink beam, that includes one or more bits that indicate the beam failure of the downlink beam; or
- receive the beam failure indication in a physical uplink control channel (PUCCH) transmission from the UE via the uplink beam.

37. The apparatus of claim 34, wherein the instructions are further executable by the processor to cause the apparatus to:
- transmit a first set of reference signals via a first set of beams associated with the downlink beam; and
- transmit a second set of reference signals via a second set of beams associated with the uplink beam, and wherein the beam failure indication indicates a parameter of one or more reference signals of the first set of reference signals as measured at the UE is below a threshold value.

38. The apparatus of claim 37, wherein the instructions are further executable by the processor to cause the apparatus to:
- configure the UE with the first set of reference signals to be monitored in the first set of beams and the second set of reference signals to be monitored in the second set of beams.

39. An apparatus for wireless communication, comprising: a processor, memory in electronic communication with the processor; and instructions stored in the memory and executable by the processor to cause the apparatus to:
- establish, at a user equipment (UE), a connection with an access network entity via a first downlink beam for transmissions from the access network entity to the UE and a first uplink beam for transmissions from the UE to the access network entity, wherein the first downlink beam and the first uplink beam are decoupled beams that use different beamforming parameters, and wherein the first downlink beam and the first uplink beam each carry control channel and data channel communications between the UE and the access network entity;
- monitor a first set of reference signals transmitted by the access network entity via a first set of beams associated with the first downlink beam, and a second set of reference signals transmitted by the access network entity via at least a second beam that is different than any beam of the first set of beams, and wherein beamforming parameters of the second beam correspond to beamforming parameters of the first uplink beam;
- determine, subsequent to one or more data channel or control channel communications via the first uplink beam, a beam failure of the first uplink beam, or both the first uplink beam and the first downlink beam, has occurred, wherein the beam failure of the first uplink beam or both the first uplink beam and the first downlink beam is determined at the UE based at least in part on the monitoring of the second set of reference signals; and
- transmit a beam failure indication to the access network entity that indicates the beam failure of the first uplink beam or both the first uplink beam and the first downlink beam.

40. The apparatus of claim 39, wherein the instructions are further executable by the processor to cause the apparatus to:
- monitor a predetermined search space for a response message from the access network entity that activates a different uplink beam, a different downlink beam, or any combinations thereof, for subsequent communications between the UE and the access network entity.

41. The apparatus of claim 39, wherein the beam failure of the first uplink beam is a function of one or more uplink parameters associated with the first uplink beam, the one or more uplink parameters including one or more of an uplink transmission power, a modulation and coding scheme (MCS), a modulation order, a coding rate, or any combinations thereof.

42. The apparatus of claim 39, wherein the instructions are further executable by the processor to cause the apparatus to:
- measure, responsive to determining the beam failure, one or more parameters of the second set of reference signals;
- identify a second uplink beam based at least in part on the measuring, and wherein the beam failure indication is transmitted via the second uplink beam; and
- receive a response message indicating that the second uplink beam is to be used for subsequent communications with the UE.

43. The apparatus of claim 42, wherein the response message is transmitted via a downlink control channel transmission having one or more of a control information format associated with a changed uplink transmission beam, an applied scrambling sequence associated with a changed uplink transmission beam, a special medium access control (MAC) control element (MAC-CE) associated with a changed uplink transmission beam, or any combinations thereof.

44. An apparatus for wireless communication, comprising: a processor, memory in electronic communication with the processor; and instructions stored in the memory and executable by the processor to cause the apparatus to:
- establish, at an access network entity, a connection with a user equipment (UE) via a first downlink beam for transmissions from the access network entity to the UE and a first uplink beam for transmissions from the UE to the access network entity, wherein the first downlink beam and the first uplink beam are decoupled beams that use different beamforming parameters, and wherein the first downlink beam and the first uplink beam each carry control channel and data channel communications between the UE and the access network entity;
- configure the UE to monitor a first set of reference signals for transmission via a first set of beams associated with the first downlink beam, and a second set of reference signals for transmission via at least a second beam that is different than any beam of the first set of beams, and wherein beamforming parameters of the second beam correspond to beamforming parameters of the first uplink beam;
- transmit the first set of reference signals and the second set of reference signals;
- receive, subsequent to one or more data channel or control channel communications via the first uplink beam, a beam failure indication from the UE that indicates a beam failure of the first uplink beam or both the first uplink beam and the first downlink beam, wherein the beam failure of the first uplink beam or both the first uplink beam and the first downlink beam is determined at the UE based at least in part on the second set of reference signals; and activate, responsive to the beam failure indication, a second uplink beam for subsequent communications with the UE.

45. The apparatus of claim 44, wherein the instructions are further executable by the processor to cause the apparatus to:

transmit, using downlink resources within a predetermined search space, a response message to the UE that activates the second uplink beam, a second downlink beam, or any combinations thereof, for subsequent communications between the UE and the access network entity.

46. The apparatus of claim 44, wherein the beam failure indication is received via the second uplink beam, and wherein the second uplink beam is associated with the second set of reference signals.

47. The apparatus of claim 44, wherein the second uplink beam is activated by a response message via a downlink control channel transmission having one or more of a control information format associated with a changed uplink transmission beam, an applied scrambling sequence associated with a changed uplink transmission beam, a special medium access control (MAC) control element (MAC-CE) associated with a changed uplink transmission beam, or any combinations thereof.

* * * * *